US008516458B2

(12) United States Patent
Stewart et al.

(10) Patent No.: US 8,516,458 B2
(45) Date of Patent: Aug. 20, 2013

(54) SYSTEM REPRESENTATION AND HANDLING TECHNIQUES

(75) Inventors: Neil Stewart, Glasgow (GB); Douglas Little, Glasgow (GB)

(73) Assignee: ITI Scotland Limited, Glasgow (GB)

( * ) Notice: Subject to any disclaimer, the term of this patent is extended or adjusted under 35 U.S.C. 154(b) by 1040 days.

(21) Appl. No.: 12/393,977

(22) Filed: Feb. 26, 2009

(65) Prior Publication Data

US 2009/0222799 A1    Sep. 3, 2009

Related U.S. Application Data

(60) Provisional application No. 61/032,547, filed on Feb. 29, 2008.

(51) Int. Cl.
*G06F 9/45* (2006.01)
*G06F 9/44* (2006.01)

(52) U.S. Cl.
USPC ........... 717/144; 717/141; 717/142; 717/143; 717/145

(58) Field of Classification Search
USPC .................. 717/143–144, 114–117, 155–156
See application file for complete search history.

(56) References Cited

U.S. PATENT DOCUMENTS

| | | | |
|---|---|---|---|
| 5,488,727 A | | 1/1996 | Agrawal et al. |
| 5,671,416 A * | | 9/1997 | Elson ............................. 717/106 |
| 5,842,204 A * | | 11/1998 | Andrews et al. ....................... 1/1 |
| 6,343,372 B1 * | | 1/2002 | Felty et al. ..................... 717/136 |
| 7,013,188 B2 * | | 3/2006 | Nicolle et al. .................. 700/86 |
| 7,082,433 B2 * | | 7/2006 | Anonsen et al. ....................... 1/1 |
| 7,325,229 B2 * | | 1/2008 | Nicolle .......................... 717/136 |
| 2002/0019971 A1 * | | 2/2002 | Zygmont et al. .................. 717/1 |
| 2002/0026632 A1 * | | 2/2002 | Fuchs et al. ..................... 717/137 |
| 2003/0226132 A1 * | | 12/2003 | Tondreau et al. ............. 717/116 |
| 2005/0050525 A1 * | | 3/2005 | Chittar et al. ................. 717/136 |
| 2006/0225052 A1 | | 10/2006 | Waddington et al. |
| 2007/0044066 A1 * | | 2/2007 | Meijer et al. .................. 717/100 |

OTHER PUBLICATIONS

Gonzalez et al. "Migrating Software from Procedural to Object-Oriented Architecture", Systems, Man, and Cybernetics, 1998. 1998 IEEE International Conference on, Oct. 1998, vol. 5 pp. 4872-4877.*
Jacobson et al. "Re-engineering of old systems to an object-oriented architecture", OOPSLA '91 Conference proceedings on Object-oriented programming systems, languages, and applications, Oct. 1991, pp. 340-350.*

(Continued)

*Primary Examiner* — Lewis A Bullock, Jr.
*Assistant Examiner* — Keith C Yuen
(74) *Attorney, Agent, or Firm* — Klein, O'Neill & Singh, LLP

(57) ABSTRACT

A computer-programming tool for generating an implementation of a first data structure, the first data structure representing at least a portion of a computer-programming language. The implementation includes a second data structure and implementation rules which define the syntax rules of the first data structure to be enforced in relation to nodes of the second data structure during a subsequent processing operation which utilizes the implementation in order to establish compliance with the syntax rules represented by the first data structure. Links between nodes of the first data structure are representative of paths of inheritance of substitutability but not implementation and interface between those nodes.

44 Claims, 18 Drawing Sheets

(56) References Cited

OTHER PUBLICATIONS

Gall et al. "Program Transformation to enhance the Reuse Potential of Procedural Software", 1994, AMC Symposium on Applied Computing (SAC'94), pp. 99-104.*

Sneed, Harry M. "Migration of Procedurally Oriented Cobol Programs in an Object-Oriented Architecture", Nov. 1992, IEEE, pp. 105-116.*

Search Report from EPO on co-pending EP application EP 08152165) dated Jan. 15, 2009.

Muchnik; "Advanced Compiler Design and Implementation"; Morgan Kaufmann; 1997; Chapter 4, pp. 67-102; XP002479081.

Weatherley; "Treecc: An Aspect-Oriented Approach to Writing Compilers"; Free Software Magazine; Jan. 10, 2002; vol. 1, Issue 2, pp. 68-75; XP002479080.

Butler et al.; "YooccLa: A Parser Generator for L-attributed Grammars"; Technology of Object-Oriented Languages and Systems, 2000; Tools-Pacif IC 2000; Proceedings 37$^{th}$ International Conference on Nov. 20-23, 2000, Piscataway, NJ, USA, IEEE, Nov. 20, 2000; pp. 214-225; XP010527800.

Parr et al.; "ANTLR Reference Manual"; Jan. 19, 2003; XP007906461.

Wang; "JTB Java Tree Builder Documentation"; Aug. 1, 2000; XP007906462.

* cited by examiner

```
Statement :=
    "if" Expression "then" Statement "else" Statement
  | Expression Declaration :=
    TypeName Identifier "=" Initializer Initializer :=
    Identifier
  | Expression Expression :=
    Expression "+" Expression
  | Expression "*" Expression
```

FIG. 2

```
root Node;

abstract Statement < Node;
abstract Declaration < Node;
abstract Initializer < Node;

node IfThenElse < Statement
{
  @condition >> Expression;
  @thenClause >> Statement;
  @elseClause >> Statement;
} node VariableDeclaration < Declaration
{
  @type >> TypeName;
  @name >> Identifier;
  @init >> Initializer;
} node Identifier < Initializer;

node Expression < Statement, Initializer
{
  @op : OperatorType;
  @lhs >> Expression;
  @rhs >> Expression;
}
```

FIG. 7

```
root Node;

abstract Statement < Node;
abstract Declaration < Node;
abstract Initializer < Node;

node IfThenElse < Statement
{
  @condition >> Expression;
  @thenClause >> Statement, Expression;
  @elseClause >> Statement, Expression;
} node VariableDeclaration < Declaration
{
  @type >> TypeName;
  @name >> Identifier;
  @init >> Initializer, Expression;
} node Identifier < Node;

node Expression < Node
{
  @op : OperatorType;
  @lhs >> Expression;
  @rhs >> Expression;
}
```

FIG. 8

```
node wildcard < *
{
}
```

FIG. 9

```
OperatorType op();
void op(OperatorType val);

NodePtr lhs();
void lhs(NodePtr n);

NodePtr rhs();
void rhs(NodePtr n);
```

FIG. 11

```
NodePtr thenClause();
void thenClause(StatementPtr n);
void thenClause(IfThenElsePtr n);
void thenClause(ExpressionPtr n);
```

FIG. 12

```
for(TreeIterator iter = startNode;
iter.more();iter.next())
{
  NodePtr node = iter.node();

// Use 'node' to operate on the current node.
}
```

FIG. 13

```
void IfThenElse::visit(Callback callback)
{
  callback(this);

if(condition) visit(condition);
  if(thenClause) visit(thenClause);
  if(elseClause) visit(elseClause);
}
```

FIG. 14

```
NodePtr * IfThenElse::enumerate(int slot)
{
  switch(slot)
  {
  case 0:
    return &condition;
  case 1:
    return &thenClause;
  case 2:
    return &elseClause;
  default:
    return NULL;
  }
}
```

FIG. 15

SYSTEM REPRESENTATION AND HANDLING TECHNIQUES

CROSS-REFERENCE TO RELATED APPLICATION

This application claims the benefit, under 35 U.S.C. §119 (e), of U.S. Provisional Application No. 61/032,547, filed Feb. 29, 2008, the disclosure of which is incorporated herein in its entirety.

FEDERALLY SPONSORED RESEARCH OR DEVELOPMENT

Not applicable.

BACKGROUND

The present disclosure relates to techniques for representing and handling a system, in particular for representing and handling a system that can be represented as a heterogeneous tree and/or graph structure. Such a system may, for example, be a language such as a computer-programming language, or a portion thereof.

The present disclosure also relates to techniques for generating an implementation of a data structure representative of such a system, and further to techniques for handling an instance of the system using such an implementation. In the example context of the system being a computer-programming language, such an instance may be a code portion expressed in that language.

Such a code portion may be considered to be a structured expression, comprising a set of interrelated symbols. Techniques embodying the present invention may be employed to perform analysis and/or manipulation in respect of the code portion. In this regard, the present disclosure relates to parsing and compiling techniques and to metaprogramming techniques.

Languages are one example of a type of system to which embodiments of the present disclosure may be applied. Languages are a form of code, and computer-programming languages are one example of code that is heavily used in modern-day technical systems. Although the present disclosure is hereinafter mainly presented in relation to computer programs, it will be appreciated that the disclosure may apply to other types of code equally (and indeed to systems other than languages).

In general, a language can be considered to be a system of arbitrary symbols and rules that define how these symbols may be manipulated. That is, languages are not just sets of symbols. They also contain a grammar, or system of rules, used to manipulate the symbols. Whilst a set of symbols may be used for expression or communication, the set of symbols alone is actually relatively inexpressive because there are no clear or regular relationships between the symbols. Because a language also has a grammar, one can manipulate its symbols to express clear and regular relationships between them. A programming language is an artificial language that can be used to control the behavior of a machine, particularly of a computer. Programming languages, like human languages, are defined through a use of syntactic and semantic rules, to determine structure and meaning respectively.

Evaluating code can be a time- and labor-intensive task. Such evaluation may, for example, include understanding the code, using the code to perform a task, and manipulating the code to alter it in some way.

One example of an activity that involves code evaluation is metaprogramming. On the broadest level, metaprogramming can be considered to be (for example) analyzing, manipulating, reconfiguring, improving or simplifying existing program code. Metaprogramming can also be considered to be the writing of computer programs that write or manipulate other programs (or themselves) as their data, or that do part of the work during compile time that is otherwise done at run time. In many cases, this allows programmers to get more done in the same amount of time as they would take to write all of the code manually. Metaprogramming usually involves the dynamic execution of string expressions that contain programming commands. Thus, programs can write programs.

A metaprogramming procedure typically involves being able to look at, or represent, program code in a useful and informative way. The evaluation of computer programming code, for example for the purpose of metaprogramming, normally involves the task of parsing. Parsing (also known as "syntactic analysis") is the process of analyzing a sequence of tokens (normally extracted from a portion of code) to determine its grammatical structure with respect to a given formal grammar for the language concerned. Parsing transforms input text into a data structure, usually a tree, which is suitable for later processing and which captures the implied hierarchy of the input code. Lexical analysis creates tokens from a sequence of input characters (i.e. from the input code) and it is these tokens that are processed by a parser to build a data structure such as a parse tree or abstract syntax tree for the instance concerned (i.e. for the code portion).

The most common use of a parser is as a component of a compiler. This parses the source code of a computer-programming language to create some form of internal representation. By way of example, FIG. 1 is a schematic diagram that demonstrates a simplified example of parsing input code written in a particular computer programming language. In this example, the computer programming language has two levels of grammar, namely lexical and syntactic.

As can be seen from FIG. 1, the first stage of parsing can involve token generation, or lexical analysis, by which the input character stream of the input code is split into meaningful symbols defined by a grammar of regular expressions. In the example of FIG. 1, the input code "a+b*c" is examined and split into the tokens a, +, b, * and c, each of which is a meaningful symbol in the context of an algebraic expression. The parser would contain rules to tell it that the characters * and + mark the start of a new token, so meaningless tokens like "a+" would not be generated. The next stage is syntactic parsing or syntactic analysis, which is checking that the tokens form an allowable expression. A result of this stage could be the building of a data structure, such as the abstract syntax tree shown in FIG. 1. A final phase (not shown in FIG. 1) could be semantic parsing or analysis, which involves working out the implications of the expression just validated and taking the appropriate action. In the case of a compiler, this could involve the generation of object code from the input source code.

An abstract syntax tree is a data structure that emulates a tree structure with a set of linked nodes. An abstract syntax tree is commonly used to represent the "inherent" logical structure of a code portion. Such a logical structure is considered "inherent" because it is ultimately based upon the grammar for the language concerned. For example, the abstract syntax tree of FIG. 1 may be considered to represent the inherent logical structure of the input code stream of FIG. 1. However, this structure is only inherent because of the rules of precedence defined in the grammar for the language concerned. It is therefore assumed in FIG. 1 that the grammar for the language concerned states that the multiply sign * takes precedence over the addition sign +. Therefore, based on this grammar, the "inherent" logical structure associates the operand tokens "b" and "c" with the operator token "*", and similarly associates the operand token "a" and the combined operand token "b*c" with the operator token "+".

A node may contain a value or a condition, or represent a separate data structure or a tree of its own. Each node in a tree has zero or more child nodes, which are below it in the tree (by convention, trees of this sort grow downwards). A node that has a child is called the child's parent node. The uppermost node in a tree is called the root node. Being the uppermost node, the root node will generally not have any parents and is the node at which operations on the tree commonly begin (although some algorithms of course may begin at other nodes of the tree, for example at the leaf nodes). All other nodes in the tree can be reached from the root node by following the links between the nodes. Such links are commonly referred to as edges. Although a tree has only one root node, other nodes in a tree can be seen as the root node of a subtree rooted at that node. Nodes at the lowermost level of the tree are called leaf nodes, or terminal nodes, or simply terminals. Since they are at the lowermost level, they do not have any children. An internal node (or inner node, or branch node, or non-terminal node, or simply non-terminal) is any node of a tree (other than the root node) that has child nodes, and is thus not a leaf node. A subtree is a portion of a tree data structure that can be viewed as a complete tree in itself.

An abstract syntax tree (AST) may be defined as a finite, labelled, directed tree, where the internal nodes are labelled by operators, and the leaf nodes represent the operands of the operators (as is the case in FIG. 1). Therefore, the leaves are null operators and only represent variables or constants. An AST is normally used in a parser as an intermediate between a parse tree and a data structure, the latter of which is often used as a compiler or interpreter's internal representation of a computer program while it is being optimized and from which code generation is performed. An AST differs from a parse tree by omitting nodes and edges for syntax rules that do not affect the semantics of the program. For example, grouping parentheses are normally omitted from an AST, since the grouping of operands is explicit from the tree structure. This again can be appreciated from consideration of FIG. 1. In FIG. 1, the input code stream could for example have been "a+(b*c)", the grouping parentheses making the rules of precedence clear. The abstract syntax tree for this code stream would however still be the same as that shown in FIG. 1, the intended grouping (or rules of precedence) being explicit from the tree structure.

It will be appreciated that a tree in the context of the present disclosure is an example of a logical structure or a data structure. Typically, each node other than the root node in such trees has at most one parent node. However, in the context of the present disclosure, it will become apparent that such "trees" are employed where some nodes have more than one parent, such that the structure becomes more like a Directed Acyclic Graph (DAG) than a tree. Accordingly, although the present disclosure is predominantly described with respect to logical structures and data structures taking the form of abstract syntax trees, it will be appreciated that structures other than traditional trees, e.g. graphs, are intended. Trees can be considered to be a special form of graph. In graph theory, a tree is a connected acyclic graph. DAGs can be considered to be a generalization of trees in which certain subtrees can be shared by different parts of the tree. In a tree with many identical subtrees, this can lead to a drastic decrease in space requirements to store the structure.

It is emphasised that the data structures (e.g. representing abstract syntax trees and/or graphs) discussed above with reference to FIG. 1 are considered to be "instance" data structures, because they represent instances of the system concerned. The input code of FIG. 1 is an instance of the language in which it is expressed, or, put another way, it is an expression written in that language.

Systems of the present disclosure, such as languages, may themselves be represented by data structures. Those "system" data structures may take the form of abstract syntax trees and/or graphs. For example, such a "system" data structure for a language may represent the organization of components of the language and its rules of grammar, such that expressions in that language are instances of that data structure (i.e. "instance" data structures).

Typically, a tool for handling an instance of a system employs an implementation of the system in order to carry out such handling. For example, such a tool may employ an implementation of the "system" data structure representative of the system in order to handle system instances of the system. In the context of a computer-programming language, the tool may be a parser or compiler and may use an implementation of the abstract syntax tree representative of the language to handle code portions written in that language. For example, the tool may generate an "instance" data structure (which itself may be an abstract syntax tree) representative of the code portion based on the implementation of the "system" data structure.

Focussing on computer programs (code portions that are instances of a computer-programming language), there are a number of different types of AST that can be used to represent them. The most common type of AST is a heterogeneous tree structure, where each type of construct in the tree is represented by a specific data structure, since this provides a compact representation that can have construct-specific behaviours associated with it. This type of "instance" structure can be implemented by code that is manually written, but is more typically generated automatically by a software tool (for example, an AST code generator) that takes a concise description of a desired logical structure (representative of an implementation of the system, in this case of the language) as its input and, given a specific candidate code portion also input to the tool, generates, as its output, means for enabling an "instance" data structure to be generated based on the "system" logical structure in order to implement the candidate code portion. In this context, the term implementation may be considered to refer to the act of enabling an "instance" data structure to be generated based on the "system" logical structure in order to implement the candidate code portion concerned. There may also be provided an interface for using the generated data structure.

It has been found that existing tools and techniques for implementing "system" data structures, and for using the implementation to generate and handle "instance" data structures representative of instances of the system concerned, suffer from a number of problems. In particular, it has been found that existing implementations in the field of computer programming are inflexible, and cause problems for techniques such as metaprogramming. Those existing tools and techniques have been found to be complicated to use, and to involve a large degree of time and effort from the programmer. The technical features of these existing tools and techniques responsible for these problems will become apparent later herein. Nevertheless it is desirable to solve some or all of such problems.

It is desirable to provide an implementation of a system, such as a computer-programming language, which enables instances of that system, such as code portions, to be handled (manipulated, evaluated, analysed, modified, transformed, etc.) in a flexible and efficient way.

SUMMARY

According to an embodiment of a first aspect of the present disclosure, there is provided an implementation tool for generating an implementation of a first data structure, wherein the first data structure comprises a plurality of linked structural components, and wherein the first data structure represents meaningful components of a given system and a parent set of interrelationships between those meaningful components, the tool comprising: first-data-structure input means, operable to receive a said first data structure, or a description thereof; and processing means operable to generate an implementation of the received first data structure, the implementation comprising: a second data structure, or a description thereof, corresponding to said first data structure, wherein said second data structure is defined by a subset of the parent set of interrelationships; and implementation rules which allow the parent set of interrelationships to be enforced during a subsequent processing operation which utilizes said implementation.

Because the second data structure is defined by a subset of the parent set of interrelationships, the second data structure may have fewer restrictions or rules associated with it than the first data structure. Thus, an instance of the second data structure may be more flexibly manipulated than an instance of the first data structure, in compliance with the data structure concerned. By means of the implementation rules, it is possible to enforce the parent set of interrelationships when, for example, handling of instances of the second data structure. The use of the implementation rules can be separate from manipulation (being one type of handling) of the instance based on the second data structure. Thus, in cases where the first data structure would be heavily complex and cause problems (discussed in more detail later) regarding handling of instances, it can be advantageous to implement the first data structure with a second data structure in which the complexity is removed to some extent and expressed (separately) in the accompanying implementation rules.

The implementation may be expressed in code, for example expressed in a computer-programming language. The first data structure (and, of course, the description thereof) may be considered to be (or describe) an idealized structure, i.e. representing the system in an ideal or simplified form. The linked structural components may be considered to be nodes and links in such a data structure. The parent set of interrelationships may be considered to define the inherent logical structure of the system (for example the grammar of a language, where the system is a language).

The structural components preferably represent respective meaningful components of said system.

The system may be any system that may be represented by a heterogeneous abstract structure, such as an abstract syntax tree or graph. The system may be a language or a portion of a language, and the language may be a computer-programming language. Preferably, the first data structure is at least partly a heterogeneous tree structure, such as an abstract syntax tree, and some or all said structural components are linked nodes of the tree structure. The first data structure may be at least partly a directed acyclic graph structure, and some or all of said structural components may be linked nodes of the graph structure.

Considering a language as the system, the system may comprise a number of syntactical elements satisfying a set of syntax rules. The nodes may represent the syntactical elements and the links may represent the syntax rules. The system may be made up of a number of tokens, and each said syntactical element may be representative of a group of said tokens or of predetermined combinations of said tokens. For example, in the case of a computer-programming language, one such syntactical element may represent a particular set of instructions, and another syntactical element may represent a subset of those instructions.

The structural components of the first data structure may comprise a root structural component, a number of first-tier structural components linked directly to the root structural component, and a number of subsequent-tier structural components linked indirectly to the root structural component via one or more other said structural components.

The links between the structural components of the first data structure may be representative of paths of inheritance of substitutability but not implementation and interface between those structural components. The links may in addition be representative of other relationships, depending on the particular application.

In object-oriented programming, inheritance is a way to form new classes (instances of which are called objects) in data structures such as abstract syntax trees using classes that have already been defined. Such classes may be considered to be nodes or structural components in the first and second data structures. The new classes, known as derived classes or inheriting classes, take over (or inherit) attributes and behaviour of the pre-existing classes, which are referred to as base classes (or ancestor classes). Such inheritance is intended to help re-use existing code with little or no modification.

An advantage of inheritance is that modules (classes or nodes) with sufficiently similar interfaces can share a lot of code, reducing the complexity of the program. Inheritance therefore has another view, a dual, called polymorphism, which describes many pieces of code being controlled by shared control code.

With this background, when a first node (the inheriting node) inherits substitutability from a second node (the ancestor node, normally being the parent node of the first node), the inheriting node may be considered to be a type or subset of the ancestor node, such that an instance of the first node may be validly substituted for an instance of the second node. Inheritance of interface may be considered to be the mating up of interfaces exposed by the ancestor node to those of the inheriting node. Inheritance of implementation may be considered to be the overriding (replacing) of one or more methods exposed by the ancestor node with methods of the inheriting node, or of adding new methods expressed within the inheriting node to those exposed by the ancestor node.

It is advantageous for links between the structural components of the first data structure to be representative of paths of inheritance of substitutability but not implementation and interface between those structural components. By only considering inheritance of substitutability, only the possible substitution of nodes for other nodes need be taken into account. In particular, by ignoring implementation and interface, possible problems with multiple inheritance of implementation and interface are avoided or overlooked.

The second data structure preferably has structural components corresponding respectively to the structural components of the first data structure. For example, the second data structure may have nodes corresponding to the above-mentioned nodes of the first data structure.

Preferably, the structural components of the second data structure comprise a root structural component, and the other structural components of the second data structure are linked directly to the root structural component. Furthermore, the links between the structural components of the second data structure are preferably representative of paths of inheritance of substitutability, implementation and interface between those structural components.

It is advantageous for links between the structural components of the second data structure to be representative of paths of inheritance of substitutability, implementation and interface between those structural components. Subsequent processing is based on this second data structure (which forms part of the implementation), and thus, for an instance of the second data structure to be properly implemented, the paths of full inheritance (i.e. of substitutability, implementation and interface) are used to build the instance nodes. By arranging for the structural components of the second data structure other than the root structural component to directly inherit from the root structural component, no issues of multiple inheritance arise. In particular, this is the case even if the corresponding network of links in the first data structure would cause multiple inheritance problems if full inheritance were implemented over those links.

Preferably, the implementation rules define rules of substitutability to be enforced in relation to structural components of the second data structure during a subsequent processing operation which utilizes said implementation in order to establish compliance with the substitutability relationships represented by the first data structure. The substitutability relationships represented by the first data structure may be central to a faithful representation of the system; however, those relationships may not be apparent from the second data structure itself. This may be the case, for example, if the structural components of the second data structure other than the root structural component directly inherit from the root structural component, but if a different network of links (representing substitutability) is present in the first data structure. Accordingly, it is advantageous to employ such implementation rules to establish (enforce, or check for) compliance with the substitutability relationships represented by the first data structure so that the subsequent processing (for example when handling an instance of the second data structure) may be faithful (or true) to the system.

Optionally, the first data structure (or, of course, the description thereof) may comprise further linked structural components representative of a system extension, the system extension being an extension to said system. The further structural components of the first data structure may represent respective meaningful components of the system extension. It will be understood that features of the first data structure may be represented or defined in the description thereof.

One or more of said further structural components of said first data structure may be defined as being substitutable for some or all of said other structural components of said first data structure. It will be appreciated that were the links in the first data structure to be representative of inheritance of implementation and interface, problems of multiple inheritance could arise in respect of such further structural components. However, this problem may be obviated within the second data structure as discussed above. In particular, the substitutability relationships pertaining to such further structural components of the first data structure may be represented in relation to the corresponding structural components of the second data structure by means of the implementation rules.

The system extension, in the case of the system being a language, could be considered to be an extension to the language. The extension may be part or all of another language. For example, in this way one computer-programming language (such as C++) may be supplemented with desired parts of another such language (such as Java), and the combined language (the system plus the system extension) implemented using the tool.

According to an embodiment of a second aspect of the present disclosure, there is provided an implementation method of generating an implementation of a first data structure, wherein the first data structure comprises a plurality of linked structural components, and wherein the first data structure represents meaningful components of a given system and a parent set of interrelationships between those meaningful components, the method comprising: receiving a said first data structure, or a description thereof; and generating an implementation of the received first data structure, the implementation comprising: a second data structure, or a description thereof, corresponding to said first data structure, wherein said second data structure is defined by a subset of the parent set of interrelationships; and implementation rules which allow the parent set of interrelationships to be enforced during a subsequent processing operation which utilizes said implementation.

According to an embodiment of a third aspect of the present disclosure, there is provided an implementation computer program which, when executed on a computing device, causes the computing device to become a tool according to the aforementioned first aspect of the present disclosure.

According to an embodiment of a fourth aspect of the present disclosure, there is provided an implementation computer program which, when executed on a computing device, causes the computing device to carry out a method according to the aforementioned second aspect of the present disclosure.

According to an embodiment of a fifth aspect of the present disclosure, there is provided an instance-handling tool for operating on an instance of the second data structure of the implementation generated by an implementation tool according to the aforementioned first aspect of the present disclosure, the instance-handling tool comprising: means storing said implementation; and means for operating on a candidate said instance in dependence upon the implementation.

The candidate instance may comprise instance structural components corresponding to structural components of the second data structure. That is, the instance structural components of the candidate instance may be implemented (built, created, constructed, managed, or handled) by way of the implementation.

The instance-handling tool may further comprise: means for receiving the candidate instance of said second data structure in an input form in which its instance structural components and links therebetween are not explicitly expressed; and conversion means for converting the received candidate instance into an abstracted form in which the instance structural components and links therebetween are explicitly expressed.

In the case that the system is a computer-programming language, and the candidate instance is a code portion expressed in said computer-programming language, the input form may be considered to be a text-based version of the code portion and the abstracted form may be considered to be an abstract syntax tree and/or graph version of said code portion (or a description thereof).

The instance-handling tool may further comprise visualization means operable to generate a visual representation of the candidate instance. Such a visual representation may be an efficient way for a user of the tool to understand the candidate instance, particularly for enabling the user to interact with the tool to handle the instance. Such handling may involve manipulating the candidate instance, and it may be desirable to visually monitor such manipulation. The instance-handling tool may comprise display means for displaying the visual representation to the user. Preferably, the visualization means is operable to generate a visual representation of the candidate instance in the abstracted form.

The instance-handling tool may further comprise manipulation means operable to manipulate the candidate instance in dependence upon the implementation. Preferably, the manipulation means is operable to manipulate the candidate instance in its abstracted form.

Preferably, the manipulation means is operable to verify such manipulation against said implementation, and to disallow manipulation that is incompliant with the second data structure and/or the implementation rules. Preferably, the manipulation means is operable to allow manipulation that is compliant with the second data structure and the implementation rules. In this way, the instance-handling tool may enable manipulation of the candidate instance in compliance with (or whilst remaining true to) the system. For example, a candidate code portion may be manipulated (in a flexible manner as discussed above) whilst remaining compliant with the computer-programming language (with or without language extensions) concerned.

Such manipulation may comprise augmenting the candidate instance and/or reducing the candidate instance. For example, the manipulation may comprise adding new instance structural components to the candidate instance, and/or removing instance structural components from the candidate instance, and/or replacing instance structural components in the candidate instance with other such instance structural components.

Such manipulation may comprise annotating, or highlighting in some way, particular instance structural components of the candidate instance. This may prove useful, in the case of a candidate code portion expressed in a computer-programming language, for a programmer. For example, it may be possible to highlight particular parts of the code portion of interest to the programmer, for example portions containing errors, or portions open to optimisation.

Such manipulation may comprise performing a predetermined process on part or all of said candidate instance. For example, the predetermined process may be defined in a set of actions, such as a computer program, accessible by the instance-handling tool. The instance-handling tool may have several such predetermined processes at its disposal, and may selectively employ those processes in dependence upon the candidate instance itself, or in dependence upon an input from a user of the tool.

The predetermined process may be an optimization process configured to optimize the candidate instance for a predetermined purpose. For example, in the case of the candidate instance being a code portion expressed in a computer-programming language, the optimization process may be configured to optimize the code portion to be executed on a particular type of processor, or combination of processors. As another example, the optimization process may be configured to simplify the way in which a particular process (such as a matrices calculation) is carried out by the code portion, for example such that resultant object code for the code portion is considerably shortened thereby saving processing time and power.

The manipulation means may be operable to perform such manipulation in dependence upon the instance structural components of the candidate instance. That is, such manipulation may be performed in several locations within the candidate instance, where a particular type of instance structural component is located. The manipulation means may be operable to identify a particular type of instance structural component and to perform such manipulation in dependence upon the identified instance structural component.

For example, the manipulation means may be configured to identify instance structural components of the candidate instance that correspond to a said further structural component of a system extension. In the case that this further structural component is defined as being substitutable for any other structural component (as mentioned above), considerable benefits may be achieved. In the case of a code portion expressed in a computer-programming language, for example, because of the universal substitutability of such a further structural component, a programmer may be able to place an entry (being an instance of that further structural component) anywhere in the code portion without violating the rules of substitutability. In that case, the programmer can freely and flexibly indicate in the code portion, for example any places where optimisation processes (manipulation) should be performed.

Of course, it will be appreciated that the manipulation means may be operable to locate particular parts of a candidate instance, or patterns within a candidate instance, and to perform the manipulation at those locations.

Based on the above, it will be appreciated that the candidate instance may include parts that are attributable to the system extension.

The conversion means of the instance-handling tool may be considered to be first conversion means, and the instance-handling tool may further comprise second conversion means operable to convert the candidate instance in said abstracted form into its corresponding input form. The second conversion means may be operable to carry out such conversion before or after such manipulation has been performed on the candidate instance. The instance-handling tool may comprise the second conversion means but not the first conversion means, and vice versa, depending on its intended purpose. The instance-handling tool may comprise means operable to output the candidate instance before or after such manipulation as object code.

The instance-handling tool may be a parser or a compiler, or any tool that comprises such a parser or compiler.

According to an embodiment of a sixth aspect of the present disclosure, there is provided an instance-handling method of operating on an instance of the second data structure of the implementation generated by an implementation tool according to the aforementioned first aspect of the present disclosure, the method comprising operating on a candidate said instance in dependence upon the implementation.

According to an embodiment of a seventh aspect of the present disclosure, there is provided an instance-handling computer program which, when executed on a computing device, causes the computing device to become an instance handling tool according to the aforementioned fifth aspect of the present disclosure.

According to an embodiment of an eighth aspect of the present disclosure, there is provided an instance-handling computer program which, when executed on a computing device, causes the computing device to carry out a method according to the aforementioned sixth aspect of the present disclosure.

According to an embodiment of a ninth aspect of the present disclosure, there is provided a method of extending a system, the method comprising: obtaining a first data structure, or a description thereof, representative of the system; adapting the first data structure, or the description thereof, to include further linked structural components representative of a system extension; and employing an implementation tool according to the aforementioned first aspect of the present disclosure to generate an implementation of the adapted first data structure. In this way, it is possible to extend such a system in an efficient manner, and on an ad-hoc basis. For example, one computer-programming language may be extended to include features from another computer-programming language in this way.

According to an embodiment of a tenth aspect of the present disclosure, there is provided a parser or compiler comprising an implementation tool according to the aforementioned first aspect of the present disclosure and/or an instance-handling tool according to the aforementioned fifth aspect of the present disclosure.

According to an embodiment of an eleventh aspect of the present disclosure, there is provided a computer program produced or adapted by means of an implementation tool according to the aforementioned first aspect of the present disclosure and/or an instance-handling tool according to the aforementioned fifth aspect of the present disclosure.

According to an embodiment of a twelfth aspect of the present disclosure, there is provided a method of producing or adapting a computer program, comprising: inputting a candidate computer program to an instance-handling tool according to the aforementioned fifth aspect of the present disclosure as the candidate instance, wherein the system concerned is a computer-programming language in which said candidate computer program is expressed; employing said instance-handling tool to operate on said candidate instance; and employing said instance-handling tool to output a computer program resulting from such operation. The produced or adapted computer program is the direct product of such a method.

According to an embodiment of a thirteenth aspect of the present disclosure, there is provided a computer or network of computers configured to function as an implementation tool according to the aforementioned first aspect of the present disclosure and/or an instance-handling tool according to the aforementioned fifth aspect of the present disclosure.

According to an embodiment of a fourteenth aspect of the present disclosure, there is provided an implementation as generated by an implementation tool according to the aforementioned first aspect of the present disclosure. Such an implementation may be in the form of a computer program.

According to an embodiment of a fifteenth aspect of the present disclosure, there is provided a computer-readable storage medium storing a computer program according to any of the aforementioned aspects of the present disclosure.

Features of apparatus (tool) aspects may apply equally to method aspects and computer-program aspects, and to other aspects of the present disclosure, and vice versa.

The disclosure extends to metaprogramming tools, methods and computer programs comprising respective tools, methods and computer programs according to the aforementioned aspects of the present disclosure.

BRIEF DESCRIPTION OF THE DRAWINGS

Reference will now be made, by way of example, to the accompanying drawings, in which:

FIG. 2 is an example language grammar excerpt;

FIG. 7 illustrates one way (first data structure description) to describe the desired design from FIG. 3;

FIG. 8 illustrates the use of multi-type references;

FIG. 9 indicates how wildcard pseudo-inheritance may be expressed in the present first data structure description scheme;

FIG. 11 is an example of generated accessor functions (for C++);

FIG. 12 is another example of generated accessor functions (for C++);

FIG. 13 is an example C++ loop using these iterator-model functions;

FIG. 14 is an example showing use of a visit( ) function;

FIG. 15 is an example showing use of an enumerate( ) function;

DETAILED DESCRIPTION

Figure 1:
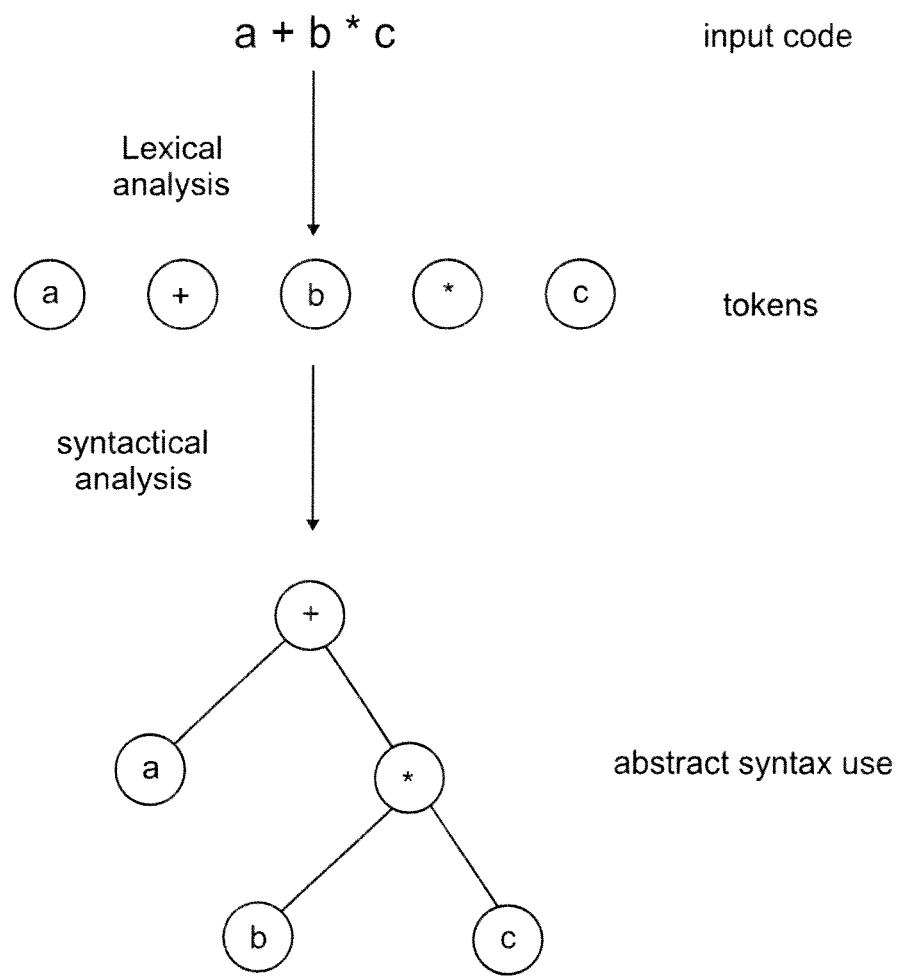
FIG. 1 is a schematic diagram that demonstrates a simplified example of parsing input code written in a particular computer programming language.

Embodiments of the present disclosure relate to a software tool designed for the purpose of translating a description of a logical structure (a description of a first data structure) representative of (part of all of) a computer-programming language (with or without an extension thereto) into an implementation (comprising a corresponding second data structure and set of implementation rules) useful for handling code portions written in that language. A modified object-oriented programming model is provided which produces a definition that more usefully implements the logical structure of a "system" AST than existing object-oriented models, and also provides greater representational flexibility than existing AST code generators. Preferred embodiments of the present disclosure seek to provide a more elegant and flexible representation of such a system to provide a better foundation on which to build a metaprogramming system. Further aspects of the present disclosure relate to other methods that build upon the model in order to build a complete AST code-generating solution.

Consideration of Existing Tools

In order to better understand embodiments of the present invention, existing tools (one of which is known as TreeCC (http://www.southern-storm.com.au/treecc.html) will be considered first. As will become apparent, logical-structure description and data-structure design form important aspects of the present disclosure. These correspond to some extent, for comparison purposes, to the methods of "system" AST generation employed in such existing tools. Accordingly, the methods of AST generation in existing tools (with a main focus on those employed in TreeCC) will be considered, to appreciate their drawbacks.

Although these existing tools are capable of generating a data structure useful for implementing a logical structure (a "system" AST structure), the resulting implementation is typically heavily dependent on the object model of the target programming language, which is not necessarily the most appropriate model to use when implementing an AST structure.

In this regard, reference is now made to the (simplified) example language grammar excerpt in FIG. 2. Statement, Declaration and Initializer are non-terminals (non-terminal nodes) and are further broken down into the various forms that each can take. In the simplified excerpt, a Statement is either one of the two forms of if-then-else statement, or is an Expression. Similarly, an Initializer is either an Identifier or an Expression.

This is a fairly common occurrence in language grammars: here, an Expression can occur in situations where a Statement is expected and in situations where an Initializer is expected.

The TreeCC tool allows AST designers to describe the different variations expected for a non-terminal through a form of inheritance, and indeed, implements this via inheritance in the language in which the AST is implemented (referred to herein as the implementation language).

Inheritance in the context of the present disclosure may be considered to refer to a way to form child nodes (inheriting nodes) from parent nodes (ancestor nodes) that have already been defined. The child nodes, known as derived nodes (or derived classes), take over (or inherit) attributes and behaviour of the parent nodes (pre-existing classes), which are also referred to as base nodes (or ancestor nodes). Inheritance is generally intended to help reuse existing code with little or no modification. An advantage of inheritance is that nodes with sufficiently similar interfaces can share a lot of code, reducing the complexity of the required code. With inheritance, it is possible to allow a child node to re-use code which already exists in a parent node, and this in commonly referred to as implementation inheritance, the matching up of interfaces for this purpose being known as interface inheritance.

Figure 3:
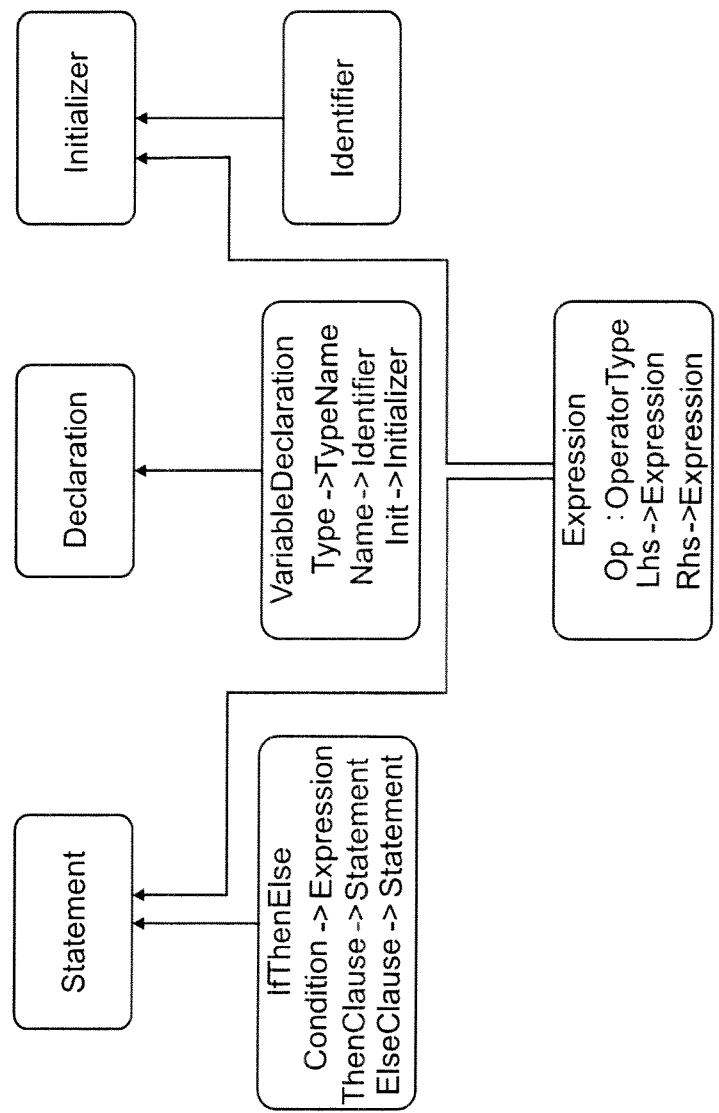
FIG. 3 is an example AST node structure based on FIG. 2.

Returning to the example of TreeCC, and considering the grammar of FIG. 2, the use of inheritance would typically lead to specifying the AST node structure shown in FIG. 3. One of the major benefits of specifying an AST structure in the way shown in FIG. 3 is that it enables type-checking to be employed. Since a relationship between Initializer and its derived types (Identifier and Expression) has been explicitly specified, any implementation of a candidate code portion can involve ensuring, for example, that nothing other than Identifier and Expression is used where an Initializer is expected. If the implementation language is statically-typed, a large part of the type-checking will be provided at compile-time by the compiler, and if it is dynamically-typed, the code generator can generate code which checks that the types of objects used match what the AST designer specifies. The same capability also applies to references from AST nodes to other AST nodes (e.g. the TypeName node referred to by the Type field of a VariableDeclaration node).

Unfortunately, the Expression node as shown in FIG. 3 cannot be expressed in TreeCC. Deriving Expression from both statement and Initializer is called multiple inheritance and TreeCC does not allow this. This is not an arbitrary decision on the part of TreeCC: some implementation languages do not support multiple inheritance and for those that do, multiple inheritance is often a problematic construct due to potential name collisions and diamond-shaped inheritance trees.

Figure 4:
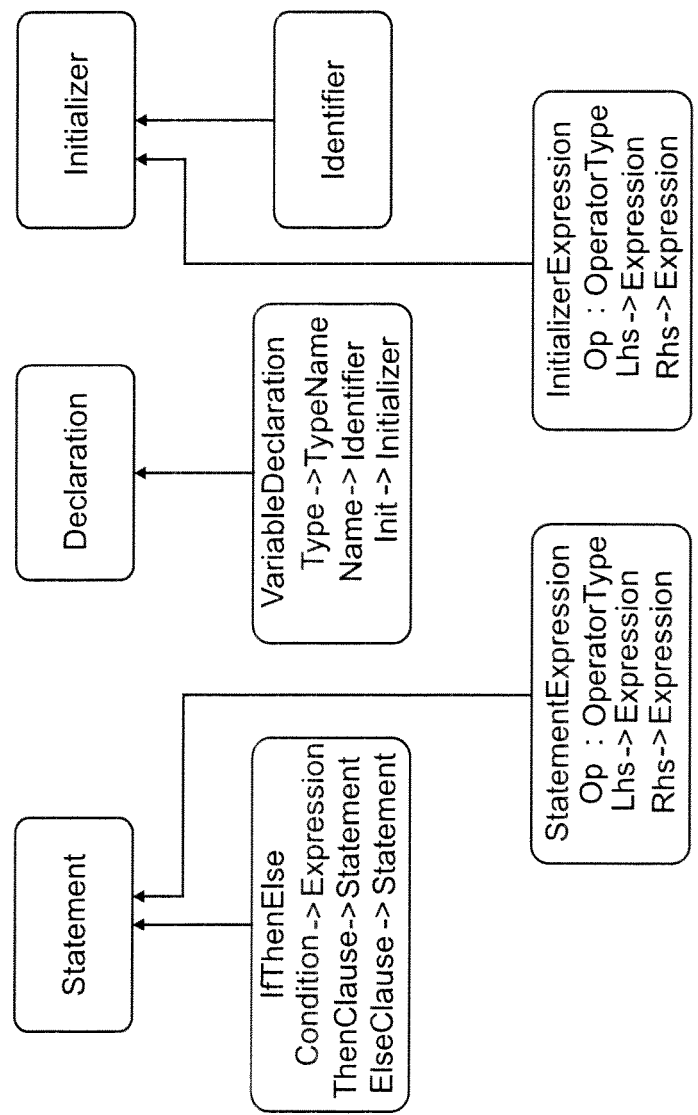
FIG. 4 is another example AST node structure based on FIG. 2.

In order to specify the example grammar in TreeCC, therefore, Expression may be split into two separate node types, e.g. StatementExpression and InitializerExpression, thus eliminating any need for multiple inheritance, as shown in FIG. 4.

Although this is a valid solution, it requires more effort on the part of the AST designer, and may also cause problems when code is added to process expressions. Because there are now two unrelated expression types, it may be necessary to write separate processing code for each one, depending on the implementation language. This is far from ideal, especially when the primary goals of an AST code generator are to reduce effort and minimize the potential for human error.

Other known AST code generators use a slightly different approach than TreeCC; rather than specifying different variations within a non-terminal through multiple nodes related by inheritance, they are expressed directly within the parent node description itself. They are expressed typically as simple constructs with references to the real nodes, although they can represent simple nodes directly. The example grammar would therefore need to be represented with these other known tools as shown in FIG. 5.

Figure 5:
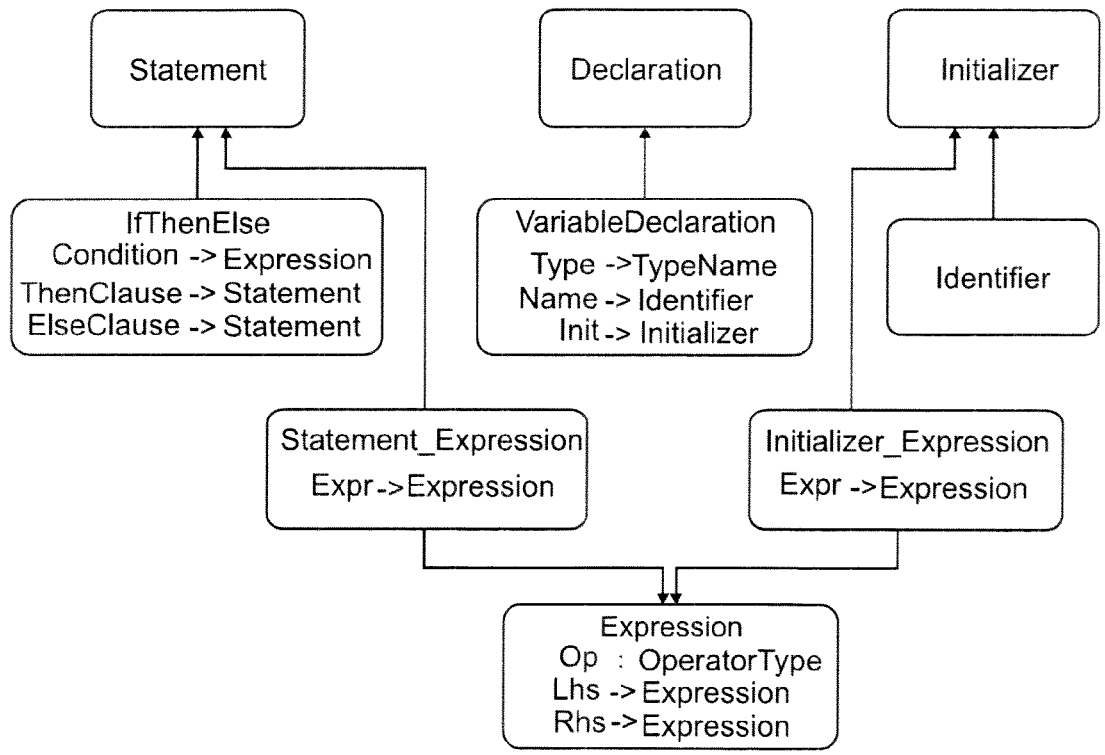
FIG. 5 is another example AST node structure based on FIG. 2.

The FIG. 5 structure is even more complicated than the structures of FIGS. 3 and 4, and, depending on how it is implemented in the generated code, can lead to a larger number of runtime objects being required to represent the same program. Specifying the FIG. 5 structure in the AST description language is also more complicated than for the FIGS. 3 and 4 structures, especially if the AST designer wishes to minimize wastage as much as possible. This structure solves the multiple inheritance problem by essentially removing the notion of inheritance from the specification altogether, but like the solution required when using TreeCC, the results are not ideal.

Of the known existing AST code generators, all of them suffer from these problems. A more ideal solution would allow the structure shown in FIG. 2, while eliminating the problems caused by multiple inheritance. Further problems also arise with existing solutions when an AST is used in a metaprogramming environment, where flexibility and ease of manipulation become critical factors.

For example, when metaprogramming, it is often desirable to decorate the "instance" AST for the particular program (code portion) concerned with constructs specified by the programmer, rather than the original "system" AST designer. This allows the programmer to imbue extra meaning upon the program's representation in a number of creative ways, which is a critical element in providing a workable metaprogramming environment.

One way to provide this flexibility is through attributes, which are custom values that the programmer can attach to existing nodes to add extra meaning to the AST. Although useful, attributes can only be attached to existing "system" nodes, and can become cumbersome to use for certain tasks, compared to having specific node types for these tasks that fully integrate into the "system" tree.

An example of this is a desired metaprogramming construct, which will be referred to during later description of embodiments of the present disclosure as a Syntax Extension Block (SEB). An SEB is essentially a piece of code, typically expressed using a scripting language, intended to be attached into an "instance" AST directly above a sub-tree to operate on it. Although an SEB could be attached to an AST as an attribute, it is simpler and more efficient to represent it as a separate node in this way.

Figure 6:
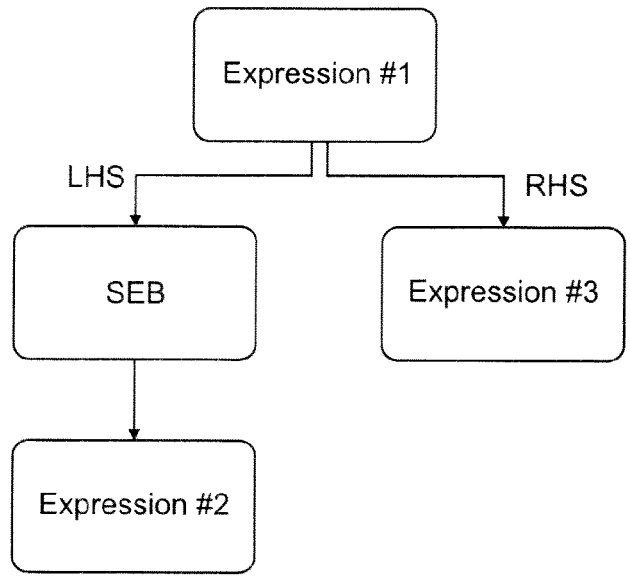
FIG. 6 is an example AST node structure having an injected Syntax Extension Block.

Unfortunately, since it would be desirable to attach an SEB potentially anywhere in an AST, this would cause problems with type-safety. This can be seen in FIG. 6, in which an SEB node has been injected into the "instance" AST between Expression #1 and Expression #2, where the LHS reference in Expression #1 was expecting to refer to a node of type Expression. If the SEB node is not related to (i.e. derived from) Expression, then the type checking system provided by a statically-typed language would not allow this.

The problem with this type of construct is that the only way to allow it to occur in a type-safe manner is to allow an SEB to inherit from every other node type in the "system" AST design; a rather extreme use of multiple inheritance that would cause serious problems in existing systems.

Another issue with using existing solutions for metaprogramming (and in general) is that they provide tree-walking interfaces based on the so-called Visitor Pattern. The Visitor Pattern is a method whereby a provided piece of code walks over a complex data structure (like an "instance" AST, or logical structure), typically visiting each node only once, and calls a user-provided function for each node it visits. Through this mechanism, user code can operate on complex data structures without requiring knowledge of their underlying structure or having to deal with any difficult rules that may need to be followed in order to perform a valid walk.

Although this is a useful method, it does have some drawbacks. The most obvious one, from a user's perspective, is that the visitor handling code needs to be passed a function to call for each node visited (often called a callback). In some languages, this is straightforward (e.g. languages with "closures" or something similar, such as Lisp and Ruby), but in other languages (such as C++ and Java), this can be a fairly laborious, complicated process (typically involving function objects), and it is generally impossible in such languages to integrate the use of a visitor into surrounding code.

The other major drawback, which is partially related to the difficulty of integrating a visitor into surrounding code, is that of control. With a visitor pattern, control of the walk is entirely in the hands of the visitor code, i.e. it will generally visit all nodes in the specified data structure until it is finished. Although a visitor mechanism can be provided with extra terminating/control functions that the user can call in order to modify the walk process in some way, this generally needs to be done within the callback function, which may not have enough contextual information to make such a decision, since it is separate from the code surrounding the invocation of the visit call. Again, in languages with closure support (or equivalent), this can be a trivial problem to overcome, but in languages without such support, it generally requires extra information to be passed into function objects, which can be wasteful and generate significant extra work for the programmer.

Another issue with using existing solutions is that, when working with an "instance" AST representation of a program or code portion (including building such a representation during parsing of the program), it is sometimes useful to be able to re-use sub-trees and refer to them from more than one place in the structure. It is further sometimes useful to be able to do so in a manner such that it appears that all such references "own" the sub-trees in question.

One example of this occurs when using a Generalized LR (GLR) parsing mechanism to parse a complex language with ambiguities, where an ambiguous element in the input may cause the parser to effectively split into two parsers, each one with a different understanding of what that element actually means. When this happens, both parsers need to be passed the "instance" AST sub-tree already constructed up to that point. If the logical structure is represented by a standard tree structure, where each node only has one parent, then the sub-tree must be deep copied (making a copy of all nodes in the subtree), which can be very expensive if the sub-tree is large. A more efficient solution would be to allow shallow copies, whereby the sub-tree can be referenced by more than one parent node with shared ownership semantics (i.e. the sub-tree is destroyed only when none of the parents references it any longer).

Again, for some implementation languages, this can be achieved without any further help from the AST code generator; if the implementation language supports garbage collection, multiple nodes may reference a specific node, with the node only being destroyed when no more nodes reference it. However, for implementation languages without garbage collection (such as C++), further steps must be taken to provide this functionality.

A related issue is the notion of explicit parent references. In a simple "instance" tree structure, parent nodes reference child nodes, but child nodes do not reference their parent nodes, Although this simplifies the structure somewhat, it can increase the amount of programmer effort required to manipulate the tree.

For example: if, while visiting an "instance" AST with the visitor pattern, the callback function decides to remove the current node (either by itself or along with all its children), it would require a reference to the parent node in order to remove the reference from the parent node to the child node. Since this parent reference cannot be obtained from the child node, such an operation would either be impossible, or would rely on the visitor mechanism providing functionality that allows the callback function to obtain a parent reference that the visitor tracks when walking the logical structure. There are other possible solutions to this when using parentless trees, but these generally involve extra programmer-effort and various other compromises.

Since known AST code generators generally use a tree structure with no parent links, and do not appear to provide functionality for obtaining parent links through the visitor mechanism, tree manipulation (and hence, metaprogramming) with these solutions can sometimes be rather cumbersome.

Overview

It has been appreciated by the inventors that previously-considered systems use a relatively direct translation between a description of the logical structure (AST) of the programming language (system) concerned, and the implementation of that system in the form of a data structure. They therefore tend to suffer from a lack of flexibility and conciseness as a result. This in turn forces users of these solutions to give up some level of type-safety in order to improve flexibility.

Embodiments of the present disclosure include a method of generating an implementation (comprising a second data structure, or a description thereof, and implementation rules) for describing, representing, and generating a representation of, a computer-programming language from a concise, flexible description format (of a first data structure) that also describes the language and that fits naturally with the way humans think about structures such as languages. Although concentration is placed on computer-programming languages here, it will be appreciated that the present disclosure may apply to other types of language, and indeed to other types of system that can be represented by a heterogeneous tree/graph structure.

Specifically, embodiments of the present disclosure allow nodes of the data structures ("system" AST) to be related to each other through "simulated" multiple inheritance (of substitutability, but not interface or implementation), and to refer to each other through multi-type references, providing type-safe construction and manipulation facilities which operate within a concise, elegant and flexible generated programming interface.

Embodiments of the present disclosure aim to maximize flexibility, conciseness and type-safety at the same time. It will become apparent that there is provided a method for representing highly-flexible nodes which can be placed anywhere in an AST in a manner which maintains type-safety, an important addition which makes applications such as metaprogramming more practical.

There is also provided a tree-walking mechanism, which can be used via a user-controlled iteration process, rather than via a Visitor pattern-based mechanism that complicates the programming interface in certain cases and is cumbersome to use with implementation languages without support for closures.

The method of representation disclosed herein also allows an AST to be represented in a form similar to a Directed Acyclic Graph (DAG), where each node can be "owned" by more than one other node, and each node can track back to all the nodes which own it (its parents). This provides opportunities for efficiencies in AST construction and manipulation not available with previously-considered purely tree-based solutions.

Details of the Disclosure

Embodiments of the present disclosure are preferably provided in the form of a software tool that generates an implementation of a system, in this case of a computer-programming language. Such embodiments take as an input a description of a first data structure ("system" AST) which represents the language concerned, and whose links between nodes represent inheritance of substitutability but not implementation and interface. Such embodiments generate an implementation of the system therefrom, the implementation comprising a second data structure ("system" AST) and implementation rules. In the second data structure, the nodes other than the root node inherit directly from the root node. The implementation rules specify the substitutability relationships inherent in the first data structure for use with instances (code portions) of the second data structure. Embodiments of the present are also provided in the form of a software tool (e.g. a parser or compiler) that employs such a generated implementation to handle instances (code portions) of the second data structure.

For the benefit of further explanation, it will be appreciated that three categories of programming language are referred to herein. Each category has a different relevance/significance in the embodiments being presented. The three categories are: Base Language (BL), Transformation Language (TL), and Framework Implementation Language (FIL).

The Base Language (BL) is the language in which programs (code) to be handled (evaluated/analysed/transformed) are expressed. The language C++ is one example of a possible BL, however any language that stands to benefit from such handling (analysis, transformation and extension capabilities) could be employed. Thus, in the context of the present invention, it will be appreciated that a candidate code portion is expressed in the BL.

The Transformation Language (TL) is the language in which meta-level program transformations are expressed (embedded or otherwise). Meta-level program transformations are discussed later herein. However, at this stage they may be considered to express desired metaprogramming operations. The actual TL chosen is less important than the functionality it represents. The TL is not actually limited to a single language, but could be a composite of different languages which may even include the language used as the BL. The key identifying feature of the TL is that meta-level programs are expressed in it. For specific cases of the BL, however, using a different language for the TL is beneficial in terms of expressivity and therefore productivity.

The Framework Implementation Language (FIL) is the language in which tools embodying the present disclosure are mainly written. Such a tool may comprise or have access to generated libraries and interfaces also expressed in the FIL. The FIL could for example also be C++. The significance of the FIL relates to the production of tools or tool add-ons for operating on (handling) candidate code portions (e.g. programs) expressed in the BL, and also for generating the implementation of the BL in the first place.

While it is envisaged that tools could be developed to operate in "unusual" environments (such as in Java or other virtual machines), performance considerations make C++a suitable choice for the FIL in the vast majority of cases. There need not be any difference between the BL and the FIL. These languages are given different names herein primarily to avoid confusion when referring to the languages used to implement the various different functions, tools and processes embodying or used in embodiments of the present disclosure.

First Data Structure Description

The first data structure description ("system" AST description) may be considered to be a description of the logical structure of the BL, so that instances of the BL (i.e. candidate code portions) can eventually be handled. Properties of such (AST) description utilized in embodiments of the present disclosure allow such a logical structure to be described via a high-level description that provides the features of "simulated multiple inheritance of substitutability" and "multi-type references", each of which are considered in greater detail below. These features are then encoded into the implementation (second data structure and implementation rules) used to implement the first data structure (in effect to implement the BL) using whatever features are available in the FIL.

In order to understand the first data structure description ("system" AST description) employed herein, FIG. 7 illustrates one way to describe the desired design from FIG. 3.

A logical-structure node may be one of three types: root, abstract and node. There can be only one root node (as mentioned above), and it is the node from which all other nodes must ultimately be derived. An abstract node is a node which can never be created—it simply exists in order for other nodes to inherit from it, and is an analogue of a grammar non-terminal which primarily lists variant forms. A node of type node is a real, concrete node which can contain a body describing the contents of the node. Each type of node is described in the description by beginning a node declaration with the associated keyword (root, abstract or node).

As shown in the FIG. 7 example, there is a single root node called Node and three abstract nodes called Statement, Declaration and Initializer, which "pseudo-inherit" from Node.

This pseudo-inheritance (explained below) is specified by the <operator. The abstract nodes match the three nodes of the same name in FIG. 3.

Following this, there are four concrete nodes, i.e. nodes of type node, which match the remaining nodes of the same name in FIG. 3. These nodes are called IfThenElse, VariableDeclaration, Identifier and Expression. Each of these concrete nodes except Identifier have bodies in the description of FIG. 7 surrounded by braces ({ and }). Concrete nodes typically have such bodies, but this is not essential.

Of particular interest here is the pseudo-inheritance relationship (explained below) specified for node Expression. Following the <operator, there is a list of two node types separated by a comma. This signifies that Expression pseudo-inherits from both Statement and Initializer. This is to some extent equivalent to the multiple inheritance relationship that was not possible to express with the TreeCC tool mentioned earlier. The reason this is only equivalent to some extent to the multiple inheritance relationship mentioned above with regard to TreeCC is as follows. In the context of the present method of first data structure description, a node that is described as being pseudo-inherited from another node can be used by any references which expect a node of the parent type, i.e. this pseudo-inheritance relationship merely indicates which types of node can be substituted for which other types of node (which is referred to herein as substitutability). This is the intended meaning of the above-mentioned feature "simulated multiple inheritance of substitutability". In particular, this relationship does not indicate inheritance of implementation and interface.

Inside the concrete nodes of FIG. 7, there are two types of field declaration. The first type, denoted by the >> operator, is a child reference, which signifies that the field references from the present node to another node and that the present node will "own" that other node when a valid reference is placed in that field. The term on the left of the >> operator is the name of the field, and the term on the right is the type of node that can be referenced by this field.

The second type of field declaration, denoted by the : operator, is a data field, which signifies that the node will contain a piece of data of the specified type. As with the child reference, the name of the field is on the left of the : operator, and the type of the field is on the right.

Overlooking the use of the root node this first data structure (AST) description closely matches the desired structure shown in FIG. 3. Although this is the most natural way of expressing this structure, it is possible to describe a roughly equivalent structure by using "multi-type references" (instead of multiple pseudo-inheritance) as shown in FIG. 8.

Although the description of FIG. 8 is structurally different from the description of FIG. 7, it ultimately may result in an implementation that is essentially equivalent in use. The differences are underlined in FIG. 8 for ease of comparison with FIG. 7.

In FIG. 8, Expression is no longer derived from Statement and Initializer, and extra terms have been added to three of the child references in two of the nodes. Both the thenClause and elseClause fields in the IfThenElse node now specify a list of node types that can be referenced—the Expression node has been specified as well as the Statement node. A similar modification has been made to the init field of the VariableDeclaration node. When multiple node types are specified for a child reference field, this is interpreted to mean that any node type in the list is a valid type to be referenced by that field.

Therefore, in the FIG. 8 example, the use of multiple pseudo-inheritance regarding node Expression has been removed to specify that it is substitutable for Statement and Initializer, and instead this substitutability is encoded directly into the child reference fields. In both cases, an Expression node can be used in all child reference fields where a Statement or an Initializer node can be used.

From a usability point-of-view, it will be appreciated that the multiple pseudo-inheritance approach of FIG. 7 is more concise and more elegant for this scenario than the approach of FIG. 8 (the multi-type reference approach is overly repetitious). However, since multi-type references are more specific, they can be very useful for situations where multiple pseudo-inheritance would be more general than is desired. Indeed, many language grammars use more specific variant forms in certain cases, and so the ability to use a similar representation in the description affords the designer a greater ability to match the structure of the BL grammar, if this is desired.

As mentioned above, pseudo-inheritance in the context of the present description scheme means a particular type of inheritance, somewhat different to the inheritance provided by most object-oriented languages. In many languages, inheritance primarily means that the derived class (e.g. the child node) incorporates the interface and implementation from the parent class (e.g. the parent node) and (depending on the programming language) also that the derived class can be used anywhere the parent class can be used, and that the derived class can override functions from the parent class such that the derived class' versions of the functions are called instead of the parent's (called polymorphism). However, in the context of the present invention, pseudo-inheritance specified in the first data structure description scheme only means that the derived class can be used in places that the parent class can be used, referred to herein as substitutability. Derived classes do not inherit any interface or implementation features from the parent class, nor any ability to service polymorphic function calls through this relationship. Indeed, as will become apparent below regarding the generation of implementation code to define a second data structure and implementation rules as an implementation of the BL, and for use in handling a code portion expressed in the BL, derived classes in the second data structure do not actually inherit from the classes of their parent nodes at all in second data structure, which is a significant factor in allowing the second data structure to support the simulated multiple inheritance model of the present disclosure.

One exception to this is the root node, which all other nodes directly inherit from in the second data structure (as will become apparent later). Inheritance in the second data structure directly from the root nodes is full traditional inheritance, i.e. inheritance of substitutability, implementation and interface.

Another significant element in the present logical-structure (AST) description scheme is that of "owned" and "non-owned" references. The FIGS. 7 and 8 examples use owned references (called child references) exclusively. As the name states, a child (owned) reference is used to specify how a node references its child nodes in the structure. The presence of child-node references in effect forms the overall logical structure. For example, the Expression node in the FIGS. 7 and 8 examples contains two child node references, called lhs and rhs. When an expression (i.e. an instance) is constructed at runtime, these references are used to build expression trees ("instance" data structures) where each Expression node can refer to two child Expression nodes, and so on recursively, until an expression of arbitrary complexity has been formed. Within this expression tree, each Expression node owns the two child nodes that it references. By "own", it is meant that the parent node controls the lifetime of the child nodes, if the parent node is deleted, or if its child-reference fields are cleared, the child nodes are normally destroyed as well. It is noted though that multi-parenting somewhat complicates this; multi-parenting is therefore discussed further below.

A non-owned reference is similar to an owned reference, a difference being that the parent node does not control the lifetime of the referenced node. Indeed, this is not even a true parent-child relationship, so these references are referred to as link references. With a link reference, not only does the present parent node not control the lifetime of the referenced node, it cannot guarantee that the referenced node will continue to exist as long as it does. The referenced node will be owned by another parent node, but since that other parent's lifetime could be shorter than that of the present parent node, so may be its child node's.

Link references are specified in the present first data structure (AST) description scheme in a similar fashion to child references, but using the > operator instead of the >> operator. Link references are especially useful for linking symbol usage points in an AST to symbol declaration points, but they can be used for a number of other purposes.

The difference between child and link references is also important when it comes to walking and manipulating a logical structure (AST). When walking over a logical structure, link references are ignored, primarily because they do not represent true child nodes, and will be walked over by iterating through their real parent. When manipulating a logical structure, link references do not appear in the list of incoming parent connections to a node, again because they are not true child nodes across such references.

Another significant element in the present first data structure description scheme concerns the use of wildcard pseudo-inheritance. Since the scheme allows for arbitrary use of "simulated" multiple inheritance, i.e. of multiple pseudo-inheritance, a node can be made to pseudo-inherit from all other nodes, which means that it can be substituted for any of them in child/link references. Since this is such a useful capability, it has a dedicated form in the present logical-structure description scheme, as shown in FIG. 9.

As shown in FIG. 9, the syntax for a node using wildcard pseudo-inheritance is the same as for any other node, but with a * symbol specifying what it should pseudo-inherit from, instead of a list of specific nodes. When a node is specified in this manner, it is interpreted as if the pseudo-inheritance list had included every other node in the description. Such a node may be an SEB.

Generating Implementation Code

In order for the principles of embodiments of the present disclosure to be realized, i.e. for a candidate code portion written in a particular language (the BL) to be efficiently handled (understood/analysed/manipulated/augmented, etc.), a representation of the candidate code portion (an "instance" AST) is generated. In order to generate such an "instance" AST, an implementation of the first data structure description above is employed, and the following concerns this implementation (which, in particular, comprises a second data structure and implementation rules).

The present disclosure therefore concerns, at least in part, the generation of such an implementation (second data structure and implementation rules) from the first data structure description. In the context of the present disclosure, such a second data structure may be considered to have nodes corresponding respectively to the nodes of the first data structure (logical structure). In this sense, the two structures may be considered equivalent to one another, i.e. so that they both represent the BL, albeit in slightly different ways.

The generation of such an implementation may result in implementation code that expresses that implementation, i.e. which expresses the second data structure and implementation rules. In the present embodiment, such implementation code is expressed in the FIL, and is thus highly dependent on that FIL. The implementation language (FIL) assumed here is C++, but it will be appreciated that other languages may be used, for example other statically-typed, object-oriented languages such as Java. Certain aspects of the present generation may apply to any implementation language.

One significant feature of the present implementation code generation is the manner in which "simulated" multiple inheritance, i.e. multiple pseudo-inheritance, expressed in the first data structure description is translated into the implementation code to define the second data structure (and the implementation rules). As stated earlier, the "inheritance" expressed in the above-discussed first data structure description scheme is pseudo-inheritance that only models substitutability, and therefore such pseudo-inheritance between the logical-structure nodes cannot be implemented directly as normal inheritance between the corresponding nodes of the second data structure via the links between those nodes using the "normal" inheritance mechanism of the implementation language (FIL), since most languages attach further meaning to the notion of inheritance than that implied by pseudo-inheritance, which in turn causes problems with multiple inheritance. Further, many implementation languages (FILs) do not support normal multiple inheritance.

This significant feature provided by the present implementation code, which defines the second data structure for use in implementing the BL, is for nodes in the second data structure other than the root node to directly inherit from the root data-structure node. In effect, all nodes (other than the root node) inherit in the normal sense (i.e. substitutability, implementation and interface) from the root node, and do not inherit from each other. This only requires single inheritance and also means that the nodes of the second data structure do not inherit any interface or implementation from each other. An example of this implementation second data structure being applied to the intended logical structure of FIG. 3 is shown in FIG. 10 (which represents the second data structure in the present example).

Figure 10:
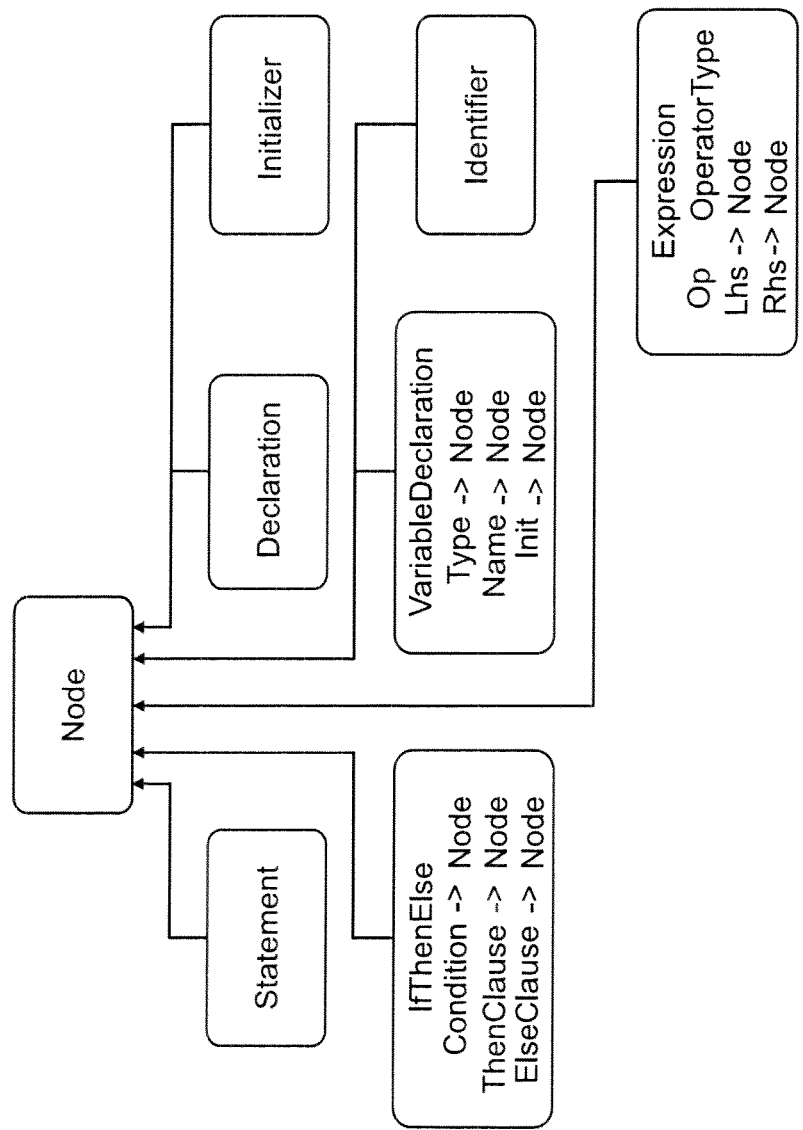
FIG. 10 is an example of an implementation (second data structure) being applied to the intended logical structure of FIG. 3.

As shown in FIG. 10, all nodes (other than the root node) inherit from the root node, Node. Even Expression, which previously pseudo-inherited (in the first data structure description) from Statement and Initializer, now (in the implementation's second data structure) only inherits from Node. All multiple inheritance (of any sort) has been eliminated from the implementation, or rather from the part of the implementation that is the second data structure; the multiple pseudo-inheritance relationships expressed in the first data structure description (i.e. the substitutability) still needs to be represented somehow for the implementation to be true to the BL and its associated logical structure.

Also as shown in FIG. 10, the child reference fields of IfThenElse, VariableDeclaration and Expression all refer to data-structure nodes of type Node (the root data-structure node type). This change (from the first data structure to the second data structure) is required because the type system of the implementation language (FIL) will (in most cases) no longer allow substitutability of Expression for Statement or initializer, or for any of the other related nodes, because they are no longer related (e.g. Expression is not derived from Statement in the second data structure).

The second data structure in FIG. 10 can advantageously be supported directly by most implementation languages (FILs), but is missing certain important elements of the original, intended logical structure (first data structure) representative of the BL as described by first data structure description, for example as shown in FIGS. 7 and 8. These elements comprise for example the pattern of links between the various nodes of the first data structure (representing the pseudo-inheritance paths, i.e. inheritance of substitutability) not present in the pattern of links between the nodes of the corresponding second data structure. These elements are re-introduced in the implementation as discussed below by way of the implementation rules, in order to enable the implementation to be true to the BL, as discussed below.

The present implementation method re-introduces these elements by means of a type-checking mechanism (the implementation rules) that reflects the type rules (i.e. the substitutability) specified in the original logical-structure description. This is preferably carried out by a dynamic type checker, which ensures that all reference fields in the tree can only be assigned a reference to a node of a compatible type, according to the simulated multiple inheritance or multiple pseudo-inheritance (FIG. 7) and multi-type reference (FIG. 8) rules specified in the first data structure (AST) description.

The process of type-checking is discussed in greater detail below, however at this stage the considerable benefits of the system are summarised.

The purpose of such type-checking is to maintain type safety. The generated implementation may be used to build an "instance" AST for a code portion expressed in the BL. The type-checking of the present system may be carried out during and/or after any manipulation or creation of the "instance" AST for the code portion concerned (the candidate code portion). In this way, at each stage it is possible to ensure that the "instance" AST is still valid in respect of the BL (i.e. that the rules of substitutability expressed in the first data structure description and implemented by the implementation rules are not violated). However, the first data structure can be very complex in terms of multiple inheritance of substitutability; several nodes can be defined as being substitutable for any other node in the first data structure. The implementation allows these rules of substitutability to be preserved by way of the implementation rules, whilst ensuring that no problems in multiple inheritance occur because only single inheritance is used in the second data structure from which the "instance" AST is built. In effect, an SEB (with wildcard pseudo-inheritance) can be built into the first data structure description relatively easily (see FIG. 9), however the second data structure remains very simple and has only single inheritance relationships. The complexity of the substitutability relationships is reserved for the implementation rules, which similarly can be expressed simply. Accordingly, an "instance" AST (representing a candidate code portion) can have any number of instance SEBs within it in any location, since the SEB is defined as being substitutable for any other type of node.

The type-checking rules used by the preferred type checker are generally as follows. For all node types listed as valid targets for any given reference field, those types and any types derived from them as expressed by the pseudo-inheritance and/or multi-type references in the first data structure description are valid node types to be referenced by that reference field. For example, if a reference field in the example first data structure description specifies Initializer as the target type, then references to nodes of type Initializer, Identifier and Expression in an "instance" AST will pass the type-check, and all other node types will cause an error (typically handled by an exception handling mechanism, but this is implementation-dependent). The specific implementation of an efficient type-checking mechanism that supports these rules is an implementation detail, but, by way of example, a (hash-based) set per node type, containing all the node types that are derived from that node type, affords a very efficient solution.

For dynamic type-checking (i.e. at run time, rather than at compile time), access to fields in a node may be provided via accessor functions, which allows the implementation to invoke the type-checking system on the references to ensure that they are valid. For example, for the Expression node, the accessor functions generated (for C++) could be as shown in FIG. 11.

Looking at FIG. 11, the first pair of functions (both called op( )) provide access to the OperatorType field (one for reading, one for writing), which is a data field and not a reference type. Accessor functions are generated for data fields primarily to keep the interface uniform across all field types.

The lhs( ) and rhs( ) pairs of functions provide access to the two child references called lhs and rhs in the corresponding AST description. The versions of these two functions which take a NodePtr as a parameter are used to set a new value for the associated field, and the implementation of these functions invokes the type-checker on the incoming reference to ensure that it is of a compatible type.

As illustrated in FIG. 11, references in the first data structure description are translated into pointers in the C++ implementation rules. In the present method, they are translated into a special type of pointer called a reference-counted smart pointer, which allows multiple objects to share ownership of another object by counting the number of objects holding a reference to it. When one of these smart pointers takes a reference to the object, it increments the reference count, and when it releases its reference to the object, it decrements the reference count. If the reference count becomes zero, the object is no longer referred to by any such pointers, and is destroyed. This mechanism allows any instance node of the second data structure to be owned by more than one parent, leading towards a graph structure (a DAG).

Although both child reference and link references use smart pointers in the present method, they actually use two different—but related—smart pointer types. Child references use a strong pointer, which is the one described above, whereas link references use a weak pointer A strong/weak smart pointer scheme requires objects to have two reference counts: a strong count and a weak count. The strong count is used to keep the object "alive", whereas the combination of the strong and weak counts is used to keep the counts themselves alive. For example, when an object is referenced by a single strong pointer and a weak pointer, it will have a strong count of 1 and a weak count of 1. If the strong pointer releases its reference, the strong count becomes 0 and the object is destroyed, but the counts remain since the total count (strong+weak) is still 1. If the weak pointer is de-referenced when the object is in this state, it will yield NULL, rather than a reference to a destroyed object. With this mechanism, weak pointers can be used to safely refer to objects owned (and destroyed) by other objects.

The translation from a reference field in the first data structure description to the FIL (in this example, C++) implementation rules can therefore be fairly direct, with the major difference in the present example being that they are represented using smart pointers that have been named NodePtr via a C++ typedef declaration. The NodePtr name is derived from the name of the root node type (Node) with Ptr appended onto the end. All smart pointers to specific node types are preferably named similarly, although they are not used directly in the second data structure (since all references translate into NodePtrs).

Although the preferred form of type-checking added by the implementation to enforce the description-specific type rules uses a dynamic checking mechanism, certain implementation languages (including C++) can also provide support for a custom static type-checking scheme, which could allow programmers to be notified of certain kinds of type error at compile time rather than at runtime.

For example, the lhs and rhs fields in Expression in the present example can only ever reference nodes of type Expression, since nothing else derives from Expression (in the present example, at least). Given this, it is unnecessary to use NodePtr either for representing the fields, or for the lhs( ) and rhs( ) function pairs—an ExpressionPtr could be used instead.

However, this is a fairly contrived example, albeit one which can occur in practice. A more common occurrence would be the thenClause field in IfThenElse, which allows references to Statement, and (via inheritance) references to IfThenElse and Expression. Since thenClause can reference more than one type of object, it must be a NodePtr rather than anything more specific, but the accessor functions can be more specific. One possible set of accessor functions for thenClause is shown in FIG. 12.

As shown in FIG. 12, the read accessor returns a NodePtr, which is no different to the lhs( ) and rhs( ) examples, but there are now three write accessors which take advantage of C++ function overloading (C++ being a preferred FIL) to provide write access through these three types of reference and no other type, which can be checked at compile time by the C++ compiler. The same effect can be achieved with a single templated function containing a compile time assert on the validity of the reference type. Not all implementation languages (FILs) provide the facilities required to achieve this effect and those that do may provide such capabilities in different ways. Nevertheless, it will be appreciated that static type-checking is not essential—it simply provides an extra layer of assistance to the programmer which may be used where possible. Incidentally, it is possible to provide a statically type-checked read accessor in C++, but not via function overloading, since the return type is not used in overload resolution in C++.

Generally speaking, the presence of wildcard inheritance in a first data structure description (AST) requires specific support in a particular area of an implementation code generator for generating the definition of the corresponding data structure. When a node is declared with wildcard inheritance, it is simply added as a derived type to all existing nodes in the first data structure description. All other mechanisms in the implementation code generator remain the same.

It may appear that using wildcard inheritance (with regard to SEBs) will somehow weaken the type-checking system, but this is not the case. Indeed, even static type-checking is affected only slightly. Taking the example accessor functions for thenClause in FIG. 12, and assuming a node called Wildcard has been added to the AST with wildcard inheritance, this merely results in an extra write accessor function for thenClause that accepts a WildcardPtr. Of course, there will be one such extra function for every reference field in the second data structure, but it should be clear that static type-checking still provides a reasonable level of safety to the programmer.

One method of tree walking used in embodiments of the present disclosure uses an iterator model, rather than the Visitor Pattern (which is almost exclusively used by existing AST code generators). A fundamental difference between the Visitor Pattern and an iterator model is that the Visitor Pattern assumes control of the walk process, whereas an iterator model relinquishes control to the user. When using a visitor-pattern approach, the user calls a visit function and provides a callback function that will be called by the visitor function for every node it visits. With an iterator, the user creates an iterator object and writes a loop which queries the iterator for the current node and tells it to advance on each iteration.

The primary benefits of the iterator-model approach are that the user controls the iteration process and can refer to local program state as iteration progresses, even with implementation languages (FILs) which do not provide support for closures (such as C++ and Java). Although implementation languages that do provide closures have this property even with a visitor-pattern approach, the present system is aimed at being as usable as possible for languages without such support.

A simple iterator model for an AST provides the following functions:
more( )—returns true if the iterator has any further nodes to yield.
node( )—returns a reference to the node that the iterator is currently positioned at.
next( )—advances the iterator to the next node in the walk, as determined by the specific walk order the iterator supports (ths most commonly being an pre-order walk).

An example C++ loop using these functions can be seen in FIG. 13. In this example, startNode is a reference to the "instance" node from which it is intended to start iterating from (iteration can begin anywhere in the structure), and TreeIterator is a generated class which provides the iterator functionality. At each iteration, a reference to the current node is copied into node, where it can then be used by any following code to operate on the node.

Providing iterator functionality for a heterogeneous tree is somewhat different than providing visitor-pattern functionality. Although the two mechanisms seem only subtly different, the iterator approach requires somewhat more effort. When generating visitor code, a code generator may generate a visit( ) function for each node, an example of which is shown in FIG. 14. This example shows a pre-order walk implemented via recursion. The first thing each visit( ) function does is call the callback function provided by the user code, passing it a reference to the current node. It then calls visit( ) recursively for each non-null child reference field in the node, which will invoke the specific visit( ) functions for the node types referenced by them, and so on, until the recursion naturally terminates at the leaves of the tree.

Unfortunately, this approach cannot be trivially converted into an iterator scheme in many implementation languages, because it would require a mechanism to allow the visit( ) function to yield to the caller rather than calling a callback. This effect can be simulated via closures, but since not all implementation languages provide closure support, it is desirably to use a different mechanism.

A number of ways to provide a workable iteration mechanism are envisaged, but they generally reduce to the same technique: providing an enumeration mechanism for the reference fields for each node type. This enumeration mechanism allows, for any node type, a caller to request the Nth reference field from the node. If such a mechanism is provided, iterating over a single node simply involves requesting all reference fields from 0 upwards until the enumerator returns a null reference (or some equivalent error code).

There are also a number of ways to implement the enumerator mechanism. One possible way is to provide an enumerate( ) function for each node type with a case statement that translates a slot number into a reference to a field reference, an example of which is given in FIG. 15. The present code generator tool does not use this technique, however, in favour of a data-based enumeration scheme.

The present iteration mechanism may be extended to iterate over an entire "instance" tree, by employing a stack to record the parent node and reference field to go back to when recursion on a child node terminates. If explicit parent references are encoded into the tree, the use of the stack can be removed, which results in a more memory-efficient iterator. Further extending the iterator to support different walk strategies is also possible (as it is for the visitor mechanism). The present iterator for example may provide both a pre-order walk and a post-order walk, as well as a combined pre- and post-order walk. User code can determine which part of the walk (pre or post) resulted in the current node through a helper function, isPost( ), which returns true if the current node's children have already been walked over.

One advantage of the iterator approach is that it is possible to implement a visitor mechanism on top of the iterator mechanism for most implementation languages, whereas the reverse is not generally possible. Indeed, because of this, the present method (in a preferred form) does not generate visitor support code, because users may create their own visitors in a few lines of code.

As stated earlier, a tree structure which does not provide explicit parent references in nodes can be cumbersome to manipulate. Accordingly, the present method of implementation allows nodes to contain parent references. However, an ability to perform shallow copying of sub-trees is a desirable quality in an AST representation especially when used in combination with a GLR (Generalized Left-to-right Rightmost derivation) parsing mechanism, but also for efficient manipulation. The two possibilities do not sit well together: if a node can have more than one parent, and if it can refer to them directly, it will actually need multiple parent references, rather than just one, which implies some kind of list or array structure per node, and this is likely to be significantly less efficient than a representation without explicit parent links and multiple parents. Furthermore, if a node has multiple parent references, detaching that node from one of its parents requires a determination of which parent reference to destroy.

The present AST representation deals with these issues with a two-stage solution. Firstly, since most nodes only have one parent, it is possible to optimise for this case by using a single parent reference. Secondly, for nodes with multiple parents, it is possible to re-use the single parent reference to reference a parent list structure that contains references to the multiple parents for that node.

Since the use of multiple parents is commonly due to efficiency concerns in the first place (e.g. shallow copying is much cheaper in terms of storage and computation than deep copying), giving up a little of this efficiency only for cases where this is used is a reasonable trade-off. It is therefore generally acceptable for a node with multiple parents to use extra storage and to require more computation to perform a detach operation.

The overall effect of these additions to the present AST implementation is that the implemented structure is more like a Directed Acyclic Graph (DAG) than a tree, but structured in such a way that it maintains many of the efficiencies of a simple tree structure, while providing graph-like capabilities where required.

Applications

As will now be appreciated, the ability of the present system (the "present system" being merely one embodiment of the present disclosure) to implement the described logical structure (first data structure) by configuring all nodes of the second data structure (other than the root node) to directly inherit from the root node, and by implementing a type-checking mechanism to re-introduce the type rules (implementation rules) specified in the original first data structure description, leads to a number of advantages in terms of flexibility and robustness.

The present system, and tools incorporating the present system, can employ a method for describing grammar-independent syntax extensions (referred to above as syntax extension blocks or SEBs and employing so-called Wildcard inheritance to effect the capability). This simplifies the integration of new language features into the BL without the necessity of interfering with the complex language grammar descriptions required for most modern programming languages. The present system makes significant use of code generation techniques to simplify the process of building a code analysis and transformation system for a new programming language. The present system incorporates a logical-structure description scheme (first data structure description) and an implementation generator (second data structure and implementation code) that provide grammar-based constraints on structure (i.e. type-checking is implemented), while allowing a controlled degree of flexibility for wildcard grammar elements (such as syntax extensions or SEBs) which are not derived in any way from the underlying language grammar of the BL. This is achieved through the techniques of pseudo-inheritance and multi-type references (i.e. substitutability) discussed in detail above and incorporated into the implementation.

Accordingly, the present system may be considered to provide a framework, which may be exploited in an array of tools and other applications useful to the metaprogrammer. It is possible to express a "system" logical structure (AST) and parser (for example a GLR parser) for candidate code portions written in the BL (Base Language), from which such tools (a number of which will be discussed below) can be generated. It becomes possible to generate metacompiler tools and libraries in the FIL (Framework Implementation Language) for processing programs (candidate code portions) expressed in the BL using specifications (i.e. the implementation) of the present system. It then becomes possible to convert program source code (candidate code portions) expressed in the BL into an "instance" AST for the BL by means of the above-mentioned metacompiler tools and libraries. It also becomes possible to analyze and optionally transform the generated "instance" AST using meta-level programs expressed in the TL (Transformation Language). It further becomes possible to convert the modified "instance" AST (abstracted form) back into code in the BL in its native text form (equivalent to an input form, or some other equally useful form, depending on the application).

Figure 16:
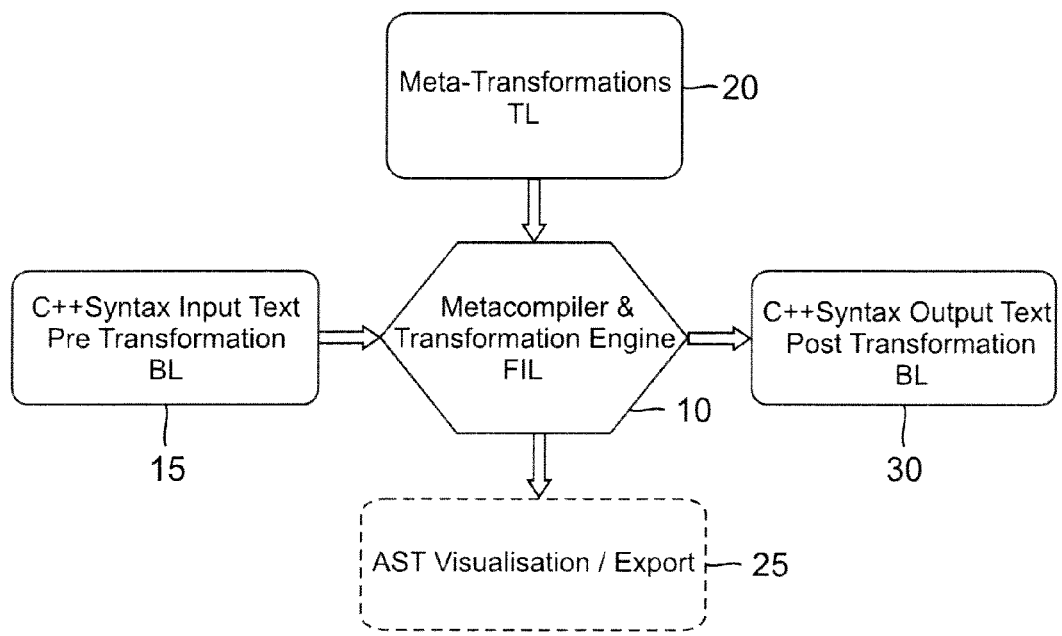
FIG. 16 is a schematic diagram of a simplified use case for a metacompiler embodying the present system, in use as part of a code transformation tool.

By way of example, FIG. 16 is a schematic diagram of a simplified use case for a metacompiler 10 embodying the present system, in use as a code transformation tool, where the BL is C++. Accordingly, the metacompiler 10 is equipped with a transformation engine.

As can be seen from FIG. 16, a candidate code portion 15 written in the BL is provided as an input to the metacompiler 10 along with meta-transformations 20 written in the TL. The metacompiler 10 is operable to generate AST description code (defining an "instance" AST) for the candidate code portion 15 and to implement that AST in accordance with the present system as described in detail above. Accordingly, it is possible to manipulate the AST for the candidate code portion 15 in accordance with the input meta-transformations 20, for example based on the location of instance SEBs.

In order to maintain type safety, the type-checking of the present system may be carried out during and/or after manipulation of the AST to ensure that the resultant AST is still valid in respect of the BL.

As indicated in FIG. 16 with dotted lines, it will be appreciated that the AST for the candidate code portion 15 (before, during, and/or after such manipulation) may be represented 25 in any convenient form for inspection or analysis by external tools, and/or for viewing by a user. A visualization layer via GraphViz may for example be provided for inspection and debugging purposes.

Following the manipulation, the metacompiler 10 is operable to convert the manipulated "instance" AST into a transformed code portion 30 equivalent to the manipulated "instance" AST and written in the BL.

Figure 17:
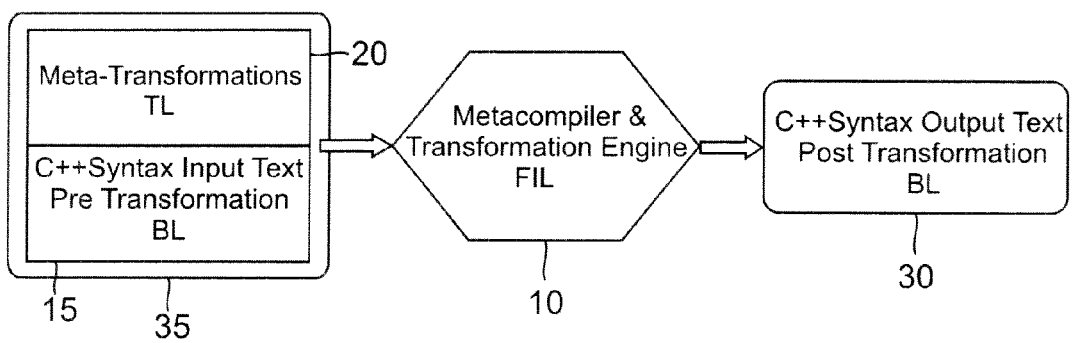
FIG. 17 is another schematic diagram of a simplified use case for a metacompiler embodying the present system, in use as part of a code transformation tool.

In practice, the present system enables the merging of the two forms of input (program code and meta-level transformations) into a unified representation, allowing both program code and meta-level transformation programs to coexist within the same source files. This is shown in FIG. 17, which is a schematic diagram of a simplified use case for a metacompiler 10 embodying the present system, in use as a code transformation tool as in FIG. 16, where the BL is C++. As can be seen from FIG. 17, a candidate code portion 15 written in the BL is provided as an input to the metacompiler 10 along with meta-transformations 20 written in the TL as in FIG. 16. However, in FIG. 17 these two inputs are provided to together in a single combined input 35, i.e. with the meta-transformations 20 embedded in the candidate code portion 15.

This embedding of extensions is achieved through 'Syntax Extensions' or SEBs (as discussed in detail above). The use of SEBs is a grammar-independent technique for embedding language extensions within a pre-existing language syntax. This scheme allows meta-level transformations written in the TL to be gradually incorporated into existing source code written in the BL, with a base minimum requirement of zero deviations from the BL specification. It is envisaged that such a scheme is important for realistic adoption/uptake within the programming community, since unmodified source code is treated no differently from 'meta-enhanced' source code.

Further applications of the system of the present disclosure are envisaged. Since the framework provided by embodiments of the present disclosure has general application, these applications are intended to demonstrate the general flexibility of the system whilst providing a number of expected use-cases. The use-cases disclosed herein are by no means exhaustive.

Figure 18:
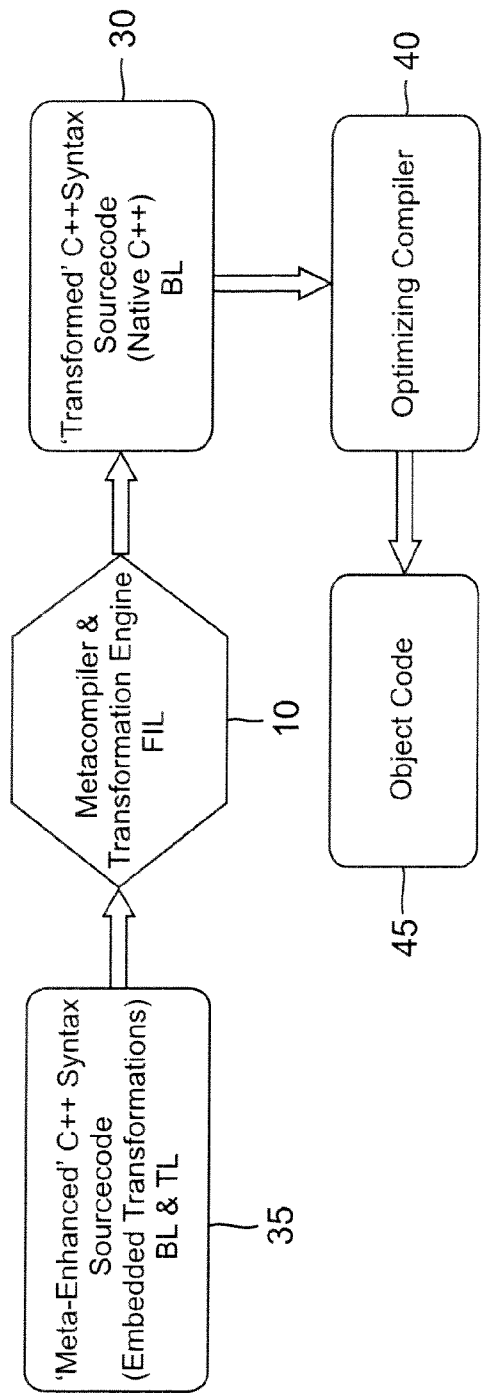
FIG. 18 is another schematic diagram of a simplified use case for a metacompiler embodying the present system, in use as part of a code transformation tool.

One application of the system of the present disclosure is to enable the use of embedded code transformations (i.e. language enhancements). FIG. 18 is a schematic diagram of a simplified use case for metacompiler 10 embodying the present system, in use as part of a code transformation tool as in FIGS. 16 and 17, where the BL is C++. Because of the use of embedded code transformations, the use case of FIG. 18 is closely similar to the use case of FIG. 17. In FIG. 18, the single combined input 35 (i.e. with the meta-transformations 20 embedded in the candidate code portion 15) may be considered to be expressed in a modified version of C++ (the BL) including transformations expressed in TL which are performed by the metacompiler 10, which in turn produces a transformed code portion 30 (Native C++ output) written in the BL equivalent to the manipulated AST. The transformed output can then be dealt with by a traditional C++ compiler 40 to produce object code 45.

Figure 19:
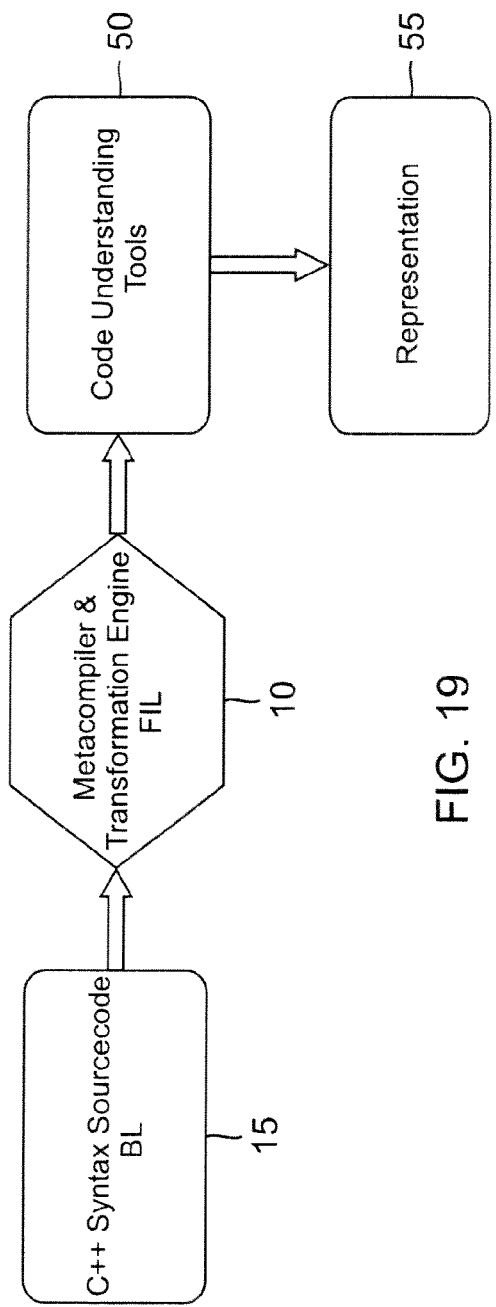
FIG. 19 is a schematic diagram of a simplified use case for a metacompiler embodying the present system, in use as part of a code-understanding tool.

Another application of the system of the present invention is to enable code understanding. Code understanding requires analysis of the AST and a final representation for the extracted meaning, FIG. 19 is a schematic diagram of a simplified use case for metacompiler 10 embodying the present system, in use as part of a code-understanding tool. As in FIG. 16, the metacompiler 10 is operable to generate AST description code for the candidate code portion 15 and to implement that AST in accordance with the present system as described in detail above. For the purpose of code understanding, there are further provided code-understanding tools 50 which can operate on the AST using the metacompiler 10 for this purpose. The final representation 55 produced following the code understanding process may take any form, but may include syntax highlighting, context-sensitive help and reformatting/shortcut suggestions.

Figure 20:
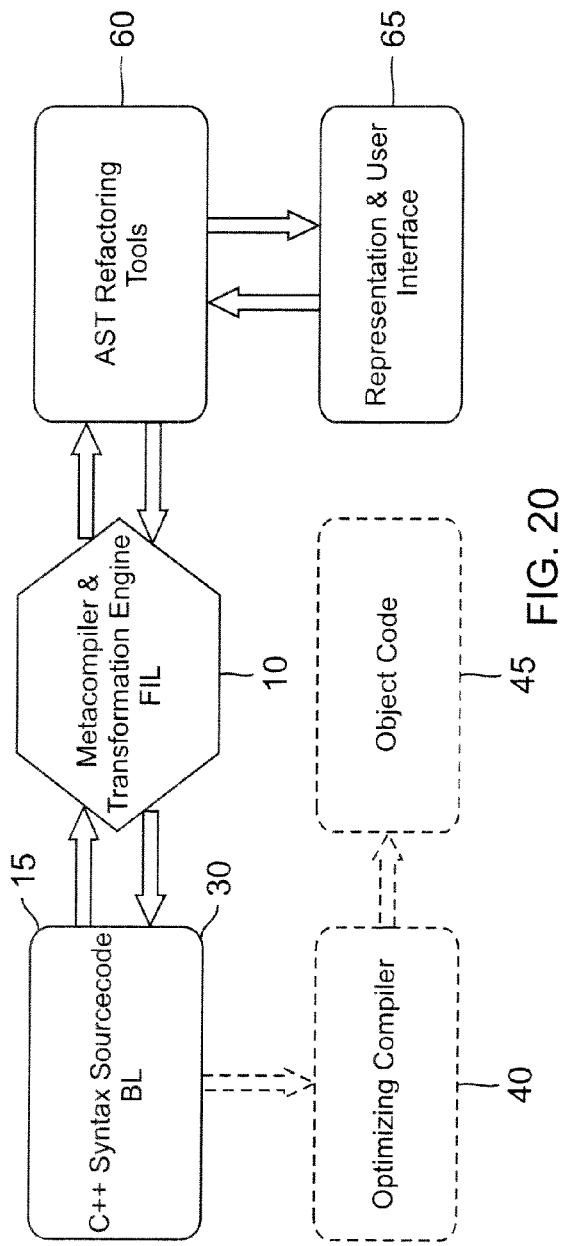
FIG. 20 is a schematic diagram of a simplified use case for a metacompiler embodying the present system, in use as part of a code-refactoring tool.

Another application of the system of the present invention is in code refactoring. Code refactoring requires aspects of code understanding plus a means to transform the program representation and automatically re-integrate the resulting changes with the original input, on a relatively broad scale. FIG. 20 is a schematic diagram of a simplified use case for metacompiler 10 embodying the present system, in use as part of a code-refactoring tool. As in FIG. 16, the metacompiler 10 is operable to generate AST description code for the candidate code portion 15 and to implement that AST in accordance with the present system as described in detail above.

For the purpose of code refactoring, the benefits of flexible AST representation and manipulation afforded by the present system are harnessed. Refactoring tools 60 are operable to make use of the AST produced in the metacompiler 10 to provide a representation for a user interface 65. Code understanding capabilities as in FIG. 19 may be utilized, and the "instance" AST may be manipulated (as in FIGS. 16 and 17) to perform such code refactoring. Consequently, following such manipulation, the metacompiler 10 is operable to covert the manipulated AST into a transformed code portion 30 written in the BL equivalent to the manipulated AST. Accurate AST source coordinates and a C++(BL) source code generator provide the basis for this functionality. As such, the original candidate code portion 15 is refactored.

The transformed output can then be dealt with by a traditional C++ compiler 40 to produce object code 45. For simplicity, the candidate code portion 15 and the transformed code portion 30 are shown in the same box in FIG. 20.

Another application of the system of the present invention is in build optimization. Build optimization allows existing code to be refactored at a source code level, such that the compilation or build cost (in terms of work performed and therefore time taken) for a given collection of source files is significantly reduced. This is a variant on code refactoring (FIG. 20) that concentrates on physical project structure rather than abstract program semantics, although elements of both can be usefully combined.

Figure 21:
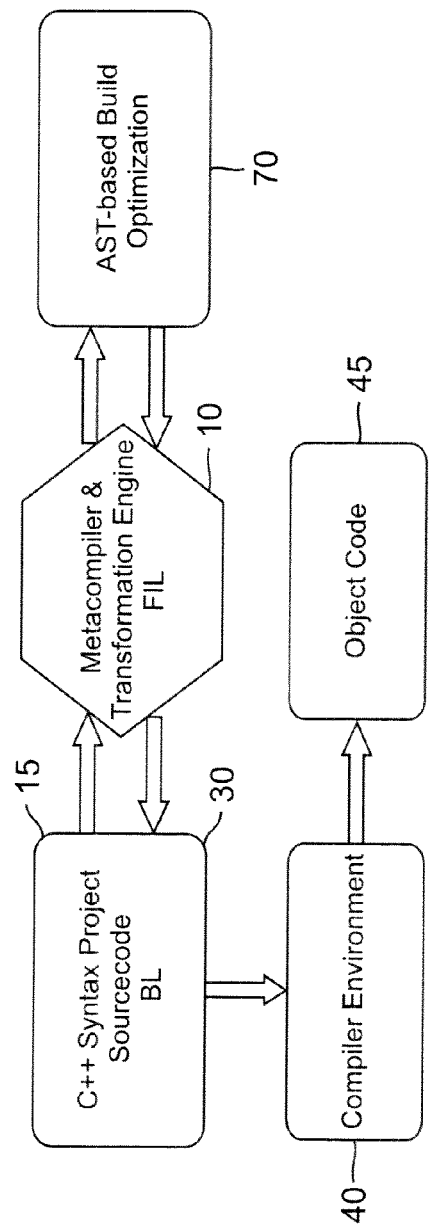
FIG. 21 is a schematic diagram of a simplified use case for a metacompiler embodying the present system, in use as part of a build-optimisation tool.

FIG. 21 is a schematic diagram of a simplified use case for metacompiler 10 embodying the present system, in use as part of a build-optimization tool. It will be appreciated that FIG. 21 is similar to FIG. 20, except that the refactoring tools 60 and user interface 65 are replaced with build optimization tools 70. AST-based source file relationship information provides a means to safely reorganize project source files at a very fine level of granularity (sub file level).

Another application of the system of the present disclosure is as a code instrumentation tool. Code instrumentation allows existing code to be automatically populated with code changes or augmentations, which may or may not involve transformations or annotation embedded within the input source code. Instrumentation scenarios include debugging, performance profiling and anti-hack technology. This technique relies on elements of code transformation and to a degree refactoring and source formatting. The flexible code-generated AST of the present system makes AST inspection, analysis and modification possible for robust, automated instrumentation.

Figure 22:
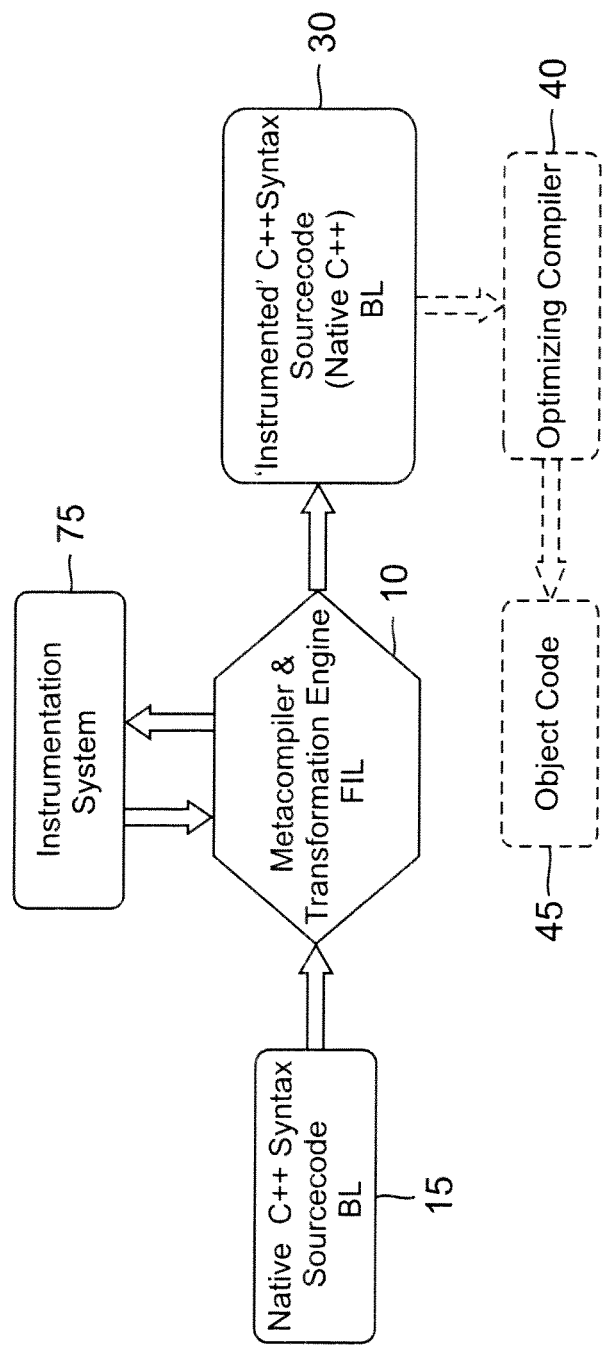
FIG. 22 is a schematic diagram of a simplified use case for a metacompiler embodying the present system, in use as part of a code-instrumentation tool.

By way of example, FIG. 22 is a schematic diagram of a simplified use case for a metacompiler 10 embodying the present system, in use as part of a code-instrumentation tool, where the BL is C++. As can be seen from FIG. 22, the candidate code portion 15 written in the BL is provided as an input to the metacompiler 10. The metacompiler 10 is operable to generate AST description code for the candidate code portion 15 and to implement that "instance" AST in accordance with the present system as described in detail above. Accordingly, as before, it is possible to manipulate the AST for the candidate code portion 15 in accordance with the input meta-transformations 20.

An instrumentation system 75 is provided as shown in FIG. 22 and is operable to interact with the AST generated in the metacompiler 10 to manipulate the AST as part of the code-instrumentation process. Following the manipulation, the metacompiler 10 is operable to covert the manipulated AST into a transformed code portion 30 written in the BL equivalent to the manipulated AST (as in FIG. 16). The transformed output can then be dealt with by a traditional C++ compiler 40 to produce object code 45.

Figure 23:
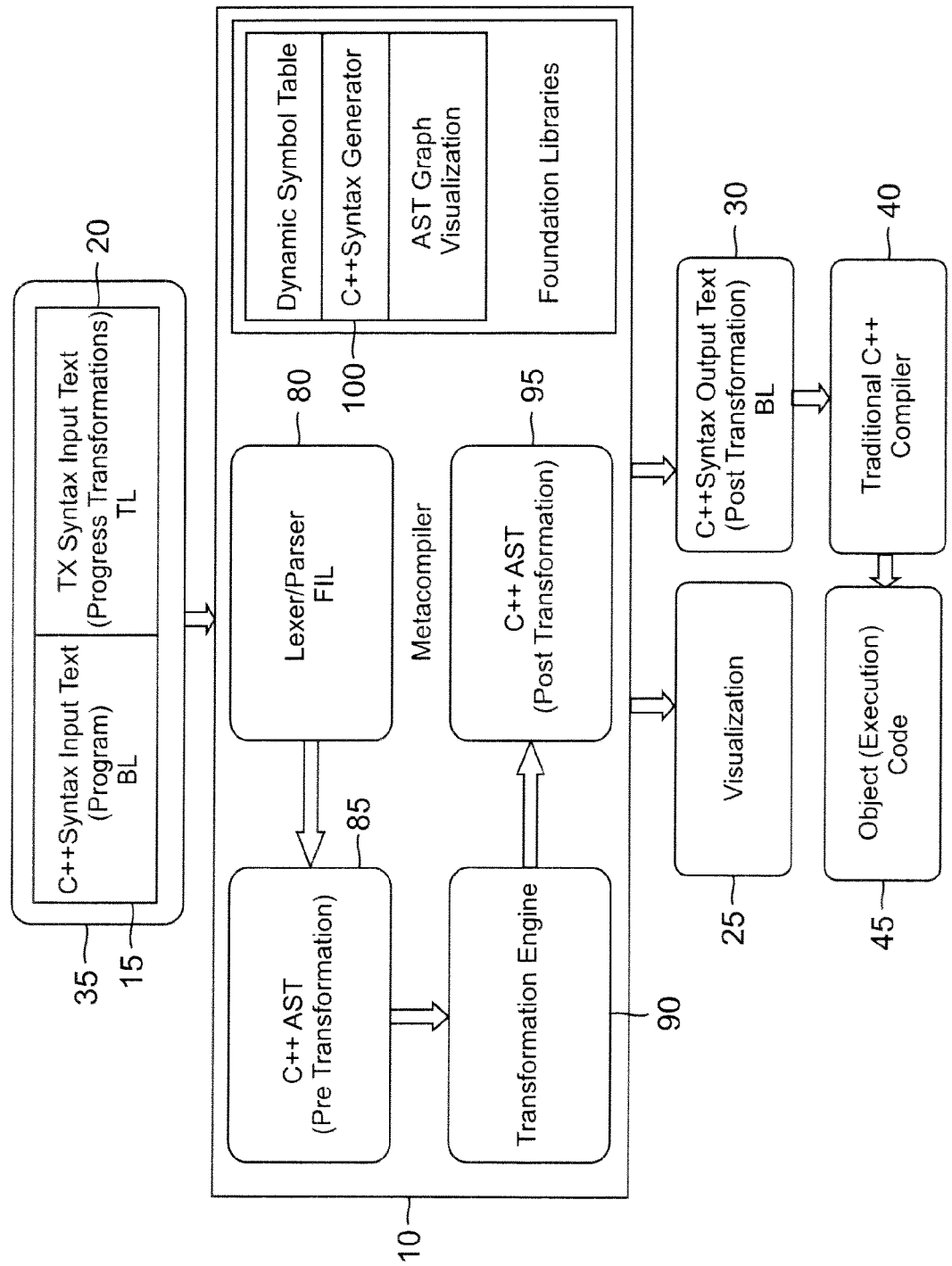
FIG. 23 is another schematic diagram of a simplified use case for a metacompiler embodying the present system, in use as part of a code-transformation tool.

As will now be appreciated, a number of the above usage cases involve some form of 'code transformation', and accordingly such code transformation will be considered further in reference to FIG. 23.

FIG. 23 is a schematic diagram of a simplified use case for metacompiler 10 embodying the present system, in use as part of a code transformation tool. FIG. 23 is to some extent an expanded version of FIGS. 17 and 18, with internal components of the metacompiler 10 indicated and labelled for reference. Accordingly, those elements of FIG. 23 already discussed in reference to FIGS. 17 and 18 are labelled in the same way.

The internal components required are to a degree dependent on the application, so not all such components are required for each usage case. For the purpose of illustration, the code-transformation scenario makes use of all of the components shown in FIG. 23.

Input programs (candidate code portions) 15 expressed in the BL (in this case, in C++), and possibly augmented with meta-program instances 20 (in this case, a combination of extended language syntax and arbitrary scripting language) expressed in the TL, are converted into an AST representation which retains the fidelity of the input program(s). This is handled by a lexer/parser component 80. The lexer/parser component 80 may be code generated by other system framework tools. The lexer and parser may be independent components in terms of function, but they are preferably generated together as a unit from a single integrated grammar file (comprising the first data structure description) for the BL. The "instance" AST representation (pre-transformation) 85 can then be modified by the transformation engine 90, which can take input from a number of different sources (as exemplified in the above-described usage cases). In this particular scenario, the input is meta-program code expressed in the TL, which is also represented separately in the AST.

The modified AST (post-transformation, or post-manipulation) 95 can then be emitted in BL form (in this case, by the C++ Syntax Generator component 100), in order to be treated by a conventional BL compiler 40 or other appropriate development tool. The AST can be emitted in any other form for storage, inspection/visualization 25, or analysis. Typically, the AST is emitted as a graph visualization for debugging of meta-programs.

One possible usage case for the present system, for example analogous with that of FIG. 20, is refactoring code written to be processed by a particular processor arrangement to be processed efficiently by a different processor arrangement. For example, code written to be processed by a single processor core could be adapted to be efficiently processed on a dual processor core, for example to take advantage of parallel processing possibilities. The present system provides an efficient way to perform such refactoring.

In any of the above aspects, the various features may be implemented in hardware, or as software modules running on one or more processors. Features of one aspect may be applied to any of the other aspects.

The disclosure also provides a computer program or a computer program product for carrying out any of the methods described herein, and a computer readable medium having stored thereon a program for carrying out any of the methods described herein. A computer program embodying any of the various aspects of the disclosure may be stored on a computer-readable medium, or it could, for example, be in the form of a signal such as a downloadable data signal provided from an Internet website, or it could be in any other form.

As discussed herein the methods described herein may be carried out by a computer or a network of computers. As one of ordinary skill in the art would inherently understand, a computer or a network of computers may have one or more processors, memory and/or storage for storing input data, intermediate data, and output data; and input and output components, for example interface cards, wired or wireless communication components, keyboards, and/or display devices. The one or more processors are generally configured by instructions so as to be operable to perform processing, for example processing of methods discussed herein, and to command storage and retrieval of data to memory and/or storage, and to command generation of visual displays on the display.

Accordingly, aspects of the invention provide for generation of an implementation of a data structure. Although the invention has been described with respect to various embodiments, it should be understood that the invention comprises the novel and unobvious claims supported by this disclosure.

The invention claimed is:

1. A computer-programming tool for generating an implementation of a first data structure, the first data structure representing at least a portion of a computer-programming language, the language comprising a plurality of syntactical elements satisfying a set of syntax rules and the first data structure comprising a plurality of linked nodes, such nodes comprising a root node, a number of first-tier nodes linked directly to the root node, and a number of subsequent-tier nodes linked indirectly to the root node via one or more other said nodes, the nodes representing such syntactical elements of the language and a pattern of links between the nodes representing paths of inheritance of substitutability but not implementation and interface between those nodes, the tool comprising:

memory operable to store one of said first data structure and a description thereof; and at least one processor configured to generate, from one said first data structure:

one of a second data structure and a description thereof, corresponding to said first data structure, the second data structure comprising nodes corresponding to the nodes of the first data structure with all nodes of the second data structure other than its root node being linked directly to the root node of the second data structure, wherein the links between the nodes of the second data structure are representative of paths of inheritance of substitutability, implementation and interface between those nodes, the processor being further operable to generate, based on the pattern of links of said one said first data structure, implementation rules which define the rules of substitutability of the first data structure to be enforced in relation to nodes of the second data structure during a subsequent processing operation which utilizes said second data structure in order to establish compliance with the inheritance of substitutability represented by the first data structure, wherein the second data structure and the implementation rules form one said implementation of the first data structure.

2. A computer-programming tool as claimed in claim 1, wherein said first data structure is at least partly a heterogeneous tree structure.

3. A computer-programming tool as claimed in claim 2, wherein said first data structure is at least partly a directed acyclic graph structure.

4. A computer-programming tool as claimed in claim 1, wherein said language is made up of a number of tokens, and wherein each said syntactical element of the language is representative of one of a group of said tokens and predetermined combinations of said tokens.

5. A computer-programming tool as claimed in claim 1, wherein the first data structure comprises further linked nodes representative of a language extension, the language extension being an extension to said computer-programming language.

6. A computer-programming tool as claimed in claim 5, wherein said further nodes of said first data structure represent respective syntactical elements of said language extension.

7. A computer-programming tool as claimed in claim 5, wherein at least one of said further nodes of said first data structure is defined as being substitutable for at least some of the other nodes of said first data structure.

8. A computer-programming tool as claimed in claim 5, wherein the implementation rules define rules of substitutability to be enforced in relation to nodes of the second data structure corresponding to said one or more further nodes of the first data structure during a subsequent processing operation which utilizes said implementation in order to establish compliance with the substitutability relationships of said one or more further nodes of the first data structure represented by the first data structure.

9. A computer-programming tool as claimed in claim 5, wherein said language extension is at least part of a language other than said computer-programming language.

10. An implementation method of generating an implementation of a first data structure, the first data structure representing at least a portion of a computer-programming language, the language comprising a plurality of syntactical elements satisfying a set of syntax rules and the first data structure comprising a plurality of linked nodes, such nodes comprising a root node, a number of first-tier nodes linked directly to the root node, and a number of subsequent-tier nodes linked indirectly to the root node via one or more other said nodes, the nodes representing such syntactical elements of the language and a pattern of links between the nodes representing paths of inheritance of substitutability but not implementation and interface between those nodes, the method comprising:

receiving one of said first data structure and a description thereof; and generating an implementation of the first data structure, comprising:

generating one of a second data structure and a description thereof, corresponding to said first data structure, the second data structure comprising nodes corresponding to the nodes of the first data structure with all nodes of the second data structure other than its root node being linked directly to the root node of the second data structure, wherein the links between the nodes of the second data structure are representative of paths of inheritance of substitutability, implementation and interface between those nodes; and generating implementation rules which define the rules of substitutability of the first data structure to be enforced in relation to nodes of the second data structure during a subsequent processing operation which utilizes said second data structure in order to establish compliance with the inheritance of substitutability represented by the first data structure.

11. A non-transitory storage medium storing an implementation computer program which, when executed on a computing device, causes the computing device to carry out an implementation method of generating an implementation of a first data structure, the first data structure representing at least a portion of a computer-programming language, the language comprising a plurality of syntactical elements satisfying a set of syntax rules and the first data structure comprising a plurality of linked nodes, such nodes comprising a root node, a number of first-tier nodes linked directly to the root node, and a number of subsequent-tier nodes linked indirectly to the root node via one or more other said nodes, the nodes representing such syntactical elements of the language and a pattern of links between the nodes representing paths of inheritance of substitutability but not implementation and interface between those nodes, the method comprising:

receiving one of said first data structure and a description thereof; and generating an implementation of the first data structure, comprising:

generating one of a second data structure and a description thereof, corresponding to said first data structure, the second data structure comprising nodes corresponding to the nodes of the first data structure with all nodes of the second data structure other than its root node being linked directly to the root node of the second data structure, wherein the links between the nodes of the second data structure are representative of paths of inheritance of substitutability, implementation and interface between those nodes; and generating implementation rules which define the rules of substitutability of the first data structure to be enforced in relation to nodes of the second data structure during a subsequent processing operation which utilizes said second data structure in order to establish compliance with the inheritance of substitutability represented by the first data structure.

12. A code-portion-handling tool for operating on a code portion, the code portion being an instance of a second data structure of an implementation generated by a computer-programming tool, for generating an implementation of a first data structure, the first data structure representing at least a portion of a computer-programming language, the language comprising a plurality of syntactical elements satisfying a set of syntax rules and the first data structure comprising a plurality of linked nodes, such nodes comprising a root node, a number of first-tier nodes linked directly to the root node, and a number of subsequent-tier nodes linked indirectly to the root node via one or more other said nodes, the nodes representing such syntactical elements of the language and a pattern of links between the nodes representing paths of inheritance of substitutability but not implementation and interface between those nodes, the tool comprising: memory operable to store one of said first data structure and a description thereof; and at least one processor configured to generate, from one said first data structure one of a second data structure and a description thereof, corresponding to said first data structure, the second data structure comprising nodes corresponding to the nodes of the first data structure with all nodes of the second data structure other than its root node being linked directly to the root node of the second data structure, wherein the links between the nodes of the second data structure are representative of paths of inheritance of substitutability, implementation and interface between those nodes, the processor being further operable to generate, based on the pattern of links of said one said first data structure, implementation rules which define the rules of substitutability of the first data structure to be enforced in relation to nodes of the second data structure during a subsequent processing operation which utilizes said second data structure in order to establish compliance with the inheritance of substitutability represented by the first data structure, wherein the second data structure and the implementation rules form one said implementation of the first data structure, the code portion being expressed in the computer-programming language, the code-portion-handling tool comprising:

memory for storing said implementation; and at least one processor configured for operating on a candidate code portion in dependence upon the implementation, the candidate code portion comprising instance nodes corresponding to nodes of the second data structure.

13. A code-portion-handling tool as claimed in claim 12, wherein:

said second data structure is in an input form in which its instance nodes and links therebetween are not explicitly expressed; and the at least one processor is configured for converting the received candidate code portion into an abstracted form in which the instance nodes and links therebetween are explicitly expressed.

14. A code-portion-handling tool as claimed in claim 13, wherein:

said candidate code portion is a code portion expressed in said computer-programming language;

said input form is a text-based version of said code portion; and said abstracted form is at least one of an abstract syntax tree and a graph version of said code portion.

15. A code-portion-handling tool as claimed in claim 12, wherein the at least one processor is operable to command generation of a visual representation of the candidate code portion on a display.

16. A code-portion-handling tool as claimed in claim 13, wherein the at least one processor is operable to command generation of a visual representation of the candidate code portion in said abstracted form.

17. A code-portion-handling tool as claimed in claim 12, wherein the at least one processor is operable to manipulate said candidate code portion in dependence upon said implementation.

18. A code-portion-handling tool as claimed in claim 13, wherein the at least one processor is operable to manipulate said candidate code portion in said abstracted form.

19. A code-portion-handling tool as claimed in claim 17, wherein said at least one processor is operable to verify such manipulation against said implementation, and to disallow manipulation that is incompliant with at least one of the second data structure and the implementation rules.

20. A code-portion-handling tool as claimed in claim 19, wherein said at least one processor is operable to allow manipulation that is compliant with the second data structure and the implementation rules.

21. A code-portion-handling tool as claimed in claim 17, wherein said at least one processor is operable to allow manipulation that includes at least one of augmenting and reducing the candidate code portion.

22. A code-portion-handling tool as claimed in claim 17, wherein such manipulation comprises adding new instance nodes to the candidate code portion.

23. A code-portion-handling tool as claimed in claim 22, wherein such manipulation comprises removing instance nodes from the candidate code portion.

24. A code-portion-handling tool as claimed in claim 22 wherein such manipulation comprises annotating particular instance nodes of the candidate code portion.

25. A code-portion-handling tool as claimed in claim 17, wherein such manipulation comprises performing a predetermined process on at least part of said candidate code portion.

26. A code-portion-handling tool as claimed in claim 25, wherein the predetermined process is defined in a set of actions accessible by the code-portion-handling tool.

27. A code-portion-handling tool as claimed in claim 25, wherein the predetermined process is an optimization process operable to optimize the candidate code portion for a predetermined purpose.

28. A code-portion-handling tool as claimed in claim 22, wherein said at least one processor is operable to perform such manipulation in dependence upon the instance nodes of the candidate code portion.

29. A code-portion-handling tool as claimed in claim 28, wherein said at least one processor is operable to identify a particular type of instance node and to perform such manipulation in dependence upon the identified instance node.

30. A code-portion-handling tool as claimed in claim 29, wherein:

the first data structure comprises further linked nodes representative of a language extension, the language extension being an extension to said computer-programming language, and the implementation rules define rules of substitutability to be enforced in relation to nodes of the second data structure corresponding to said one or more further nodes of the first data structure during a subsequent processing operation which utilizes said implementation in order to establish compliance with the substitutability relationships of said one or more further nodes of the first data structure represented by the first data structure; and the particular type of instance node is an instance node of a said further node of the language extension.

31. A code-portion-handling tool as claimed in claim 30, wherein said candidate code portion includes parts that are attributable to said language extension.

32. A code-portion-handling tool as claimed in claim 13, wherein the at least one processor is further operable to convert said candidate code portion in said abstracted form into its corresponding input form.

33. A code-portion-handling tool as claimed in claim 32, wherein the at least one processor is operable to manipulate said candidate code portion in dependence upon said implementation, and wherein the at least one processor is operable to carry out such conversion before or after such manipulation has been performed on the candidate code portion.

34. A code-portion-handling tool as claimed in claim 32, wherein:
said candidate code portion is a code portion expressed in said computer-programming language; and
the at least one processor is operable to output the candidate code portion before or after such manipulation as object code.

35. A code-portion-handling tool as claimed in claim 34, the at least one processor being configured as one of a parser and a compiler.

36. A code-portion-handling method of operating on a code portion, the code portion being an instance of a second data structure of an implementation generated by a computer-programming tool, for generating an implementation of a first data structure, the first data structure representing at least a portion of a computer-programming language, the language comprising a plurality of syntactical elements satisfying a set of syntax rules and the first data structure comprising a plurality of linked nodes, such nodes comprising a root node, a number of first-tier nodes linked directly to the root node, and a number of subsequent-tier nodes linked indirectly to the root node via one or more other said nodes, the nodes representing such syntactical elements of the language and a pattern of links between the nodes representing paths of inheritance of substitutability but not implementation and interface between those nodes, the tool comprising: memory operable to store one of said first data structure and a description thereof; and at least one processor configured to generate, from one said first data structure one of a second data structure and a description thereof, corresponding to said first data structure, the second data structure comprising nodes corresponding to the nodes of the first data structure with all nodes of the second data structure other than its root node being linked directly to the root node of the second data structure, wherein the links between the nodes of the second data structure are representative of paths of inheritance of substitutability, implementation and interface between those nodes, the processor being further operable to generate, based on the pattern of links of said one said first data structure, implementation rules which define the rules of substitutability of the first data structure to be enforced in relation to nodes of the second data structure during a subsequent processing operation which utilizes said second data structure in order to establish compliance with the inheritance of substitutability represented by the first data structure, wherein the second data structure and the implementation rules form one said implementation of the first data structure, the code portion being expressed in the computer-programming language, the method comprising operating on a candidate code portion in dependence upon the implementation.

37. A non-transitory storage medium storing a code-portion-handling computer program which, when executed on a computing device, causes the computing device to carry out a code-portion-handling method of operating on a code portion, the code portion being an instance of a second data structure of an implementation generated by a computer-programming tool, for generating an implementation of a first data structure, the first data structure representing at least a portion of a computer-programming language, the language comprising a plurality of syntactical elements satisfying a set of syntax rules and the first data structure comprising a plurality of linked nodes, such nodes comprising a root node, a number of first-tier nodes linked directly to the root node, and a number of subsequent-tier nodes linked indirectly to the root node via one or more other said nodes, the nodes representing such syntactical elements of the language and a pattern of links between the nodes representing paths of inheritance of substitutability but not implementation and interface between those nodes, the tool comprising: memory operable to store one of said first data structure and a description thereof; and at least one processor configured to generate, from one said first data structure one of a second data structure and a description thereof, corresponding to said first data structure, the second data structure comprising nodes corresponding to the nodes of the first data structure with all nodes of the second data structure other than its root node being linked directly to the root node of the second data structure, wherein the links between the nodes of the second data structure are representative of paths of inheritance of substitutability, implementation and interface between those nodes, the processor being further operable to generate, based on the pattern of links of said one said first data structure, implementation rules which define the rules of substitutability of the first data structure to be enforced in relation to nodes of the second data structure during a subsequent processing operation which utilizes said second data structure in order to establish compliance with the inheritance of substitutability represented by the first data structure, wherein the second data structure and the implementation rules form one said implementation of the first data structure, the code portion being expressed in the computer-programming language, the method comprising operating on a candidate code portion in dependence upon the implementation.

38. A method of extending a computer-programming language, comprising:
obtaining a first data structure, or a description thereof, representative of at least a portion of the language;
adapting the first data structure, or the description thereof, to include further linked nodes representative of a language extension; and
employing a computer-programming tool to generate an implementation of the adapted first data structure, the computer-programming tool being for generating an implementation of a first data structure, the first data structure representing at least a portion of a computer-programming language, the language comprising a plurality of syntactical elements satisfying a set of syntax rules and the first data structure comprising a plurality of linked nodes, such nodes comprising a root node, a number of first-tier nodes linked directly to the root node, and a number of subsequent-tier nodes linked indirectly to the root node via one or more other said nodes, the nodes representing such syntactical elements of the language and a pattern of links between the nodes representing paths of inheritance of substitutability but not implementation and interface between those nodes, the tool comprising: memory operable to store one of said first data structure and a description thereof; and at least one processor configured to generate, from one said first data structure one of a second data structure and a description thereof, corresponding to said first data structure, the second data structure comprising nodes corresponding to the nodes of the first data structure with all nodes of the second data structure other than its root node being linked directly to the root node of the second data structure, wherein the links between the nodes of the second data structure are representative of paths of inheritance of substitutability, implementation and interface between those nodes, the processor being further operable to generate, based on the pattern of links of said one said first data structure, implementation rules which define the rules of substitutability of the first data structure to be enforced in relation to nodes of the second data structure during a subsequent processing operation which utilizes said second data structure in order to establish compliance with the inheritance of substitutability represented by the first data structure, wherein the second data structure and the implementation rules form one said implementation of the first data structure, wherein the first data structure comprises further linked nodes representative of a language extension, the language extension being an extension to said computer-programming language, wherein the implementation rules define rules of substitutability to be enforced in relation to nodes of the second data structure corresponding to said one or more further nodes of the first data structure during a subsequent processing operation which utilizes said implementation in order to establish compliance with the substitutability relationships of said one or more further nodes of the first data structure represented by the first data structure.

39. A method of producing or adapting a computer program, comprising:
inputting to a code-portion-handling tool a candidate computer program expressed in at least the portion of the computer-programming language as the candidate code portion;
employing said code-portion-handling tool to operate on said candidate code portion; and
employing said code-portion-handling tool to output a computer program resulting from such operation, the output computer program being such a produced or adapted computer program;
wherein the code-portion-handling tool is for operating on a code portion, the code portion being an instance of a second data structure of an implementation generated by a computer-programming tool for generating an implementation of a first data structure, the first data structure representing at least a portion of a computer-programming language, the language comprising a plurality of syntactical elements satisfying a set of syntax rules and the first data structure comprising a plurality of linked nodes, such nodes comprising a root node, a number of first-tier nodes linked directly to the root node, and a number of subsequent-tier nodes linked indirectly to the root node via one or more other said nodes, the nodes representing such syntactical elements of the language and a pattern of links between the nodes representing paths of inheritance of substitutability but not implementation and interface between those nodes, the tool comprising: memory operable to store one of said first data structure and a description thereof; and at least one processor configured to generate, from one said first data structure one of a second data structure and a description thereof, corresponding to said first data structure, the second data structure comprising nodes corresponding to the nodes of the first data structure with all nodes of the second data structure other than its root node being linked directly to the root node of the second data structure, wherein the links between the nodes of the second data structure are representative of paths of inheritance of substitutability, implementation and interface between those nodes, the processor being further operable to generate, based on the pattern of links of said one said first data structure, implementation rules which define the rules of substitutability of the first data structure to be enforced in relation to nodes of the second data structure during a subsequent processing operation which utilizes said second data structure in order to establish compliance with the inheritance of substitutability represented by the first data structure, wherein the second data structure and the implementation rules form one said implementation of the first data structure, the code portion being expressed in the computer-programming language, the code-portion-handling tool comprising:
memory for storing said implementation; and
at least one processor configured for operating on a candidate code portion in dependence upon the implementation, the candidate code portion comprising instance nodes corresponding to nodes of the second data structure.

40. A computer-programming tool as claimed in claim 1, implemented on a computer or network of computers.

41. A computer-programming tool as claimed in claim 1, being a metaprogramming tool.

42. A code-portion-handling tool as claimed in claim 12, implemented on a computer or network of computers.

43. A code-portion-handling tool as claimed in claim 12, being a metaprogramming tool.

44. A computer programming tool as claimed in claim 2, wherein the heterogeneous tree structure is an abstract syntax tree.

* * * * *